United States Patent
Take

(10) Patent No.: US 8,411,361 B2
(45) Date of Patent: Apr. 2, 2013

(54) ZOOM LENS, AND OPTICAL APPARATUS AND METHOD FOR FORMING AN IMAGE OF AN OBJECT USING THE ZOOM LENS

(75) Inventor: Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 553 days.

(21) Appl. No.: 12/190,563

(22) Filed: Aug. 12, 2008

(65) Prior Publication Data

US 2009/0046366 A1    Feb. 19, 2009

(30) Foreign Application Priority Data

Aug. 13, 2007   (JP) ................................. 2007-210654

(51) Int. Cl.
*G02B 27/64* (2006.01)
(52) U.S. Cl. ........................................ 359/557
(58) Field of Classification Search .................. None
See application file for complete search history.

(56) References Cited

U.S. PATENT DOCUMENTS

| | | | |
|---|---|---|---|
| 6,091,551 A | 7/2000 | Watanabe | |
| 6,141,156 A | 10/2000 | Aoki | |
| 6,538,824 B1 * | 3/2003 | Mihara et al. ................. | 359/684 |
| 6,754,446 B2 | 6/2004 | Hagimori et al. | |
| 7,068,429 B1 | 6/2006 | Ori | |
| 7,139,130 B2 | 11/2006 | Yamada | |
| 7,274,516 B2 | 9/2007 | Kushida et al. | |
| 7,327,953 B2 | 2/2008 | Tamura | |
| 7,443,607 B2 | 10/2008 | Kushida | |
| 2002/0136150 A1 | 9/2002 | Mihara et al. | |
| 2003/0161620 A1 | 8/2003 | Hagimori et al. | |
| 2004/0027685 A1 | 2/2004 | Mihara et al. | |
| 2004/0095503 A1 | 5/2004 | Iwasawa et al. | |
| 2005/0083584 A1 | 4/2005 | Ito et al. | |
| 2005/0128604 A1 | 6/2005 | Kuba | |
| 2005/0195482 A1 | 9/2005 | Yamada et al. | |
| 2005/0259329 A1 | 11/2005 | Yagyu et al. | |

(Continued)

FOREIGN PATENT DOCUMENTS

| | | |
|---|---|---|
| CN | 1768290 A | 5/2006 |
| CN | 1849545 A | 10/2006 |

(Continued)

OTHER PUBLICATIONS

Extended European Search Report and Opinion from European Patent Application No. 08250722.

(Continued)

*Primary Examiner* — Derek S Chapel
(74) *Attorney, Agent, or Firm* — Miles & Stockbridge P.C.

(57) ABSTRACT

A zoom lens has a plurality of lens groups which are disposed in order from an object along an optical axis, wherein among the plurality of lens groups, a first lens group, which is disposed closest to the object, has a positive refractive power, and includes an optical axis bending element for bending the optical axis, and a plurality of lens components, which are disposed closer to the object than the optical axis bending element, and the plurality of lens components include at least one positive lens that satisfies a condition of vd>50, where vd is an Abbe number, with respect to the d-line, and at least one of the lens groups disposed closer to the image than the first lens group can move in a direction substantially perpendicular to the optical axis as a shift lens group or a partial lens component(s) constituting this lens group.

42 Claims, 19 Drawing Sheets

U.S. PATENT DOCUMENTS

| | | |
|---|---|---|
| 2005/0270646 A1 | 12/2005 | Yamada et al. |
| 2006/0274426 A1 | 12/2006 | Sueyoshi |
| 2006/0285221 A1 | 12/2006 | Bito et al. |
| 2007/0008418 A1 | 1/2007 | Kuroda et al. |
| 2007/0070516 A1 | 3/2007 | Obama et al. |
| 2007/0115560 A1 | 5/2007 | Kushida et al. |
| 2007/0126911 A1 | 6/2007 | Nanjo |
| 2007/0279743 A1* | 12/2007 | Kushida ..................... 359/557 |
| 2009/0002840 A1 | 1/2009 | Shirota |
| 2009/0141350 A1 | 6/2009 | Bito et al. |

FOREIGN PATENT DOCUMENTS

| | | | |
|---|---|---|---|
| EP | 1 717 624 A | 11/2006 | |
| EP | 1 870 757 A1 | 12/2007 | |
| JP | 10-213746 A | 8/1998 | |
| JP | 11-52242 | 2/1999 | |
| JP | 2000-292692 A | 10/2000 | |
| JP | 2000-298235 A | 10/2000 | |
| JP | 2002-303791 A | 10/2002 | |
| JP | 2003-202500 A | 7/2003 | |
| JP | 2004-170707 A | 6/2004 | |
| JP | 2004-354869 A | 12/2004 | |
| JP | 2005-84151 A | 3/2005 | |
| JP | 2005-84283 A | 3/2005 | |
| JP | 2005-084283 A | 3/2005 | |
| JP | 2005-128186 A | 5/2005 | |
| JP | 2005-173191 A | 6/2005 | |
| JP | 2006-113111 A | 4/2006 | |
| JP | 2006-171492 A | 6/2006 | |
| JP | 2006-178193 A | 7/2006 | |
| JP | 2006-184430 A | 7/2006 | |
| JP | 2006-195068 A | 7/2006 | |
| JP | 2006-276475 A | 10/2006 | |
| JP | 2007-003776 A | 1/2007 | |
| JP | 2007-3776 A | 1/2007 | |
| JP | 2007-93984 A | 4/2007 | |
| JP | 2007-139944 A | 6/2007 | |
| JP | 2007-140158 A | 6/2007 | |
| JP | 2007-148056 | 6/2007 | |
| JP | 2007-322669 | 12/2007 | |

OTHER PUBLICATIONS

Office Action dated Mar. 9, 2011 in Chinese Patent Application No. 200810210650.3.

Extended European Search Report issued Oct. 14, 2011 in Application No. 11182760.6.

Office Action issued in Japanese Application No. 2007-099530 issued Mar. 24, 2012.

* cited by examiner

LATERAL ABERRATION

LATERAL ABERRATION

LATERAL ABERRATION

LATERAL ABERRATION

LATERAL ABERRATION

LATERAL ABERRATION

ZOOM LENS, AND OPTICAL APPARATUS AND METHOD FOR FORMING AN IMAGE OF AN OBJECT USING THE ZOOM LENS

INCORPORATION BY REFERENCE

This invention claims the benefit of Japanese Patent Application No. 2007-210654 which is hereby incorporated by reference.

FIELD OF THE INVENTION

The present invention relates to a zoom lens that is used for an optical apparatus, such as a digital still camera.

BACKGROUND OF THE INVENTION

Portability is now a very critical factor in such an optical apparatus as a digital still camera, and attempts to decrease the size and weight of a zoom lens, which is a camera lens, is progressing in order to decrease the size, thickness and weight of a camera main unit. However it is difficult to hold such a camera, and a slight movement of a camera during photographing (e.g. slight motion of a camera generated when the user presses a release button) causes image blurring during exposure, which deteriorates the image quality. To solve this problem, a zoom lens, where a detection system for detecting a slight motion of a camera, a computing system for controlling a shift lens group according to the value that is output from the detection system, and a drive system for shifting the shift lens group, are combined, and the image blurring is corrected by driving the shift lens group so as to compensate the image blurring caused by the slight motion of the camera, has been disclosed (e.g. Japanese Patent Application Laid-Open No. 2005-128186).

Problems to be Solved by the Invention

In order to meet the needs of users who demand a suppression of the drop in image quality due to the slight motion of the camera and more stable image recording, a conventional optical system attempts to increase a faster shutter speed using a brighter zoom lens. However, using a bright zoom lens increases the size of the zoom lens since the aperture increases, in other words, an increase in the aperture and a decrease in the size and thickness of the camera are in a trade-off relationship.

SUMMARY OF THE INVENTION

With the foregoing in view, it is an object of the present invention to provide a zoom lens that can shift images and still implement high image formation performance with a compact size, and an optical apparatus and a method for forming an image of an object using this zoom lens.

Means to Solve the Problems

To achieve this object, the present invention is a zoom lens which has a plurality of lens groups which are disposed in order from an object along an optical axis, wherein among the plurality of lens groups, a first lens group, which is disposed closest to the object, has a positive refractive power, and comprises an optical axis bending element for bending the optical axis, and a plurality of lens components which are disposed closer to the object than the optical axis bending element, and the plurality of lens components include at least one positive lens that satisfies a condition of $$vd > 50,$$

where vd is an Abbe number with respect to the d-line, and at least one of the lens groups, which are disposed closer to the image than the first lens group can move in a direction substantially perpendicular to the optical axis, as a shift lens group or a partial lens components constituting this lens group.

In the present invention, it is preferable that a condition of $$0.7 < \beta bw \times (1 - \beta aw) < 1.4$$

is satisfied, where βaw is a lateral magnification of the shift lens group in a wide-angle end state, and βbw is a lateral magnification of the zoom lens that is disposed between the shift lens group and the image in the wide-angle end state.

In the present invention, it is preferable that the plurality of lens components are formed of two lenses.

In the present invention, it is preferable that the plurality of lens components are formed of a negative lens and a positive lens which are disposed in order from the object.

In the present invention, it is preferable that the plurality of lens components comprise a negative meniscus lens having a convex surface facing the object, and a positive meniscus lens having a convex surface facing the object, which are disposed in order from the object.

In the present invention, it is preferable that the shift lens group is fixed during zooming from a wide-angle end state to a telephoto end state.

In the present invention, it is preferable that the shift lens group comprises a plurality of lens components.

In the present invention, it is preferable that the shift lens group comprises a cemented lens.

In the present invention, it is preferable that a condition of $$0.3 < fw/fs < 0.5$$

is satisfied, where fw is a focal length of the zoom lens in the wide-angle end state, and fs is a focal length of the shift lens group.

In the present invention, it is preferable that the angle of view in the wide-angle end state is 75 degrees or more.

In the present invention, it is preferable that an aperture stop is disposed near the shift lens group.

In the present invention, it is preferable that an aperture stop is disposed near the object side of the lens component disposed closest to the object in the lens group that includes the shift lens group.

In the present invention, it is preferable that a condition of $$vd1 < 50$$

is satisfied, where vd1 is an Abbe number, with respect to the d-line, of a negative lens closest to the object among the plurality of lens components.

In the present invention, it is preferable that a condition of $$vd2 > 50$$

is satisfied, where vd2 is an Abbe number, with respect to the d-line, of a positive lens closest to the image among the plurality of lens components.

In the present invention, it is preferable that a condition of $$nd1 > 1.75$$

is satisfied, where nd1 is a refractive index, with respect to the d-line, of a negative lens closest to the object among the plurality of lens components.

In the present invention, it is preferable that a condition of nd2<1.65 is satisfied, where nd2 is a refractive index, with respect to the d-line, of a positive lens closest to the image among the plurality of lens components.

In the present invention, it is preferable that the second lens group, which is disposed to the image side of the first lens group among the plurality of lens groups, has a negative refractive index, and a condition of 0.4<(−f2)/fw<1.9 is satisfied, where fw is a focal length of the zoom lens in the wide-angle end state, and f2 is a focal length of the second lens group.

In the present invention, it is preferable that a condition of 2.4≤f1/(−f2)<3.7 is satisfied, where f1 is a focal length of the first lens group, and f2 is a focal length of the second lens group which is disposed to the image side of the first lens group, among the plurality of lens groups.

In the present invention, it is preferable that the plurality of lens groups comprise at least the first lens group, a second lens group, and a third lens group which are disposed in order from the object along an optical axis, and the third lens group is the shift lens group.

In the present invention, it is preferable that the plurality of lens groups comprise the first lens group, a second lens group, a third lens group, a fourth lens group, and a fifth lens group, which are disposed in order from the object along an optical axis, and the third lens group is the shift lens group.

In the present invention, it is preferable that the second lens group has a negative refractive power, the third lens group has a positive refractive power, the fourth lens group has a positive refractive power, and the fifth lens group has a negative refractive power, and the third lens group is the shift lens group.

The present invention is also an optical apparatus which has a zoom lens that forms an image of an object on a predetermined image surface, wherein the zoom lens is the zoom lens according to one of claim 1 to claim 20.

The present invention is also a method for forming an image of an object on a predetermined image that uses a zoom lens which has a plurality of lens groups which are disposed in order from the object along an optical axis, wherein a first lens group, which is disposed closest to the object among the plurality of lens groups, has a positive refractive power, an optical axis bending element for bending an optical axis and a plurality of lens components, which are disposed closer to the object than the optical path axis bending element, are disposed, and the plurality of lens components include at least one positive lens that satisfies a condition of vd>50, where vd is an Abbe number with respect to the d-line, and at least one of the lens groups disposed closer to the image than the first lens group can shift to a direction substantially perpendicular to the optical axis as a shift lens group, or partial lens components constituting this lens group.

Advantageous Effects of the Invention

As described above, the present invention can implement a zoom lens that can shift images and still obtain high image formation performance with compact size, and an optical apparatus and a method for forming an image of an object that uses this zoom lens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1A:
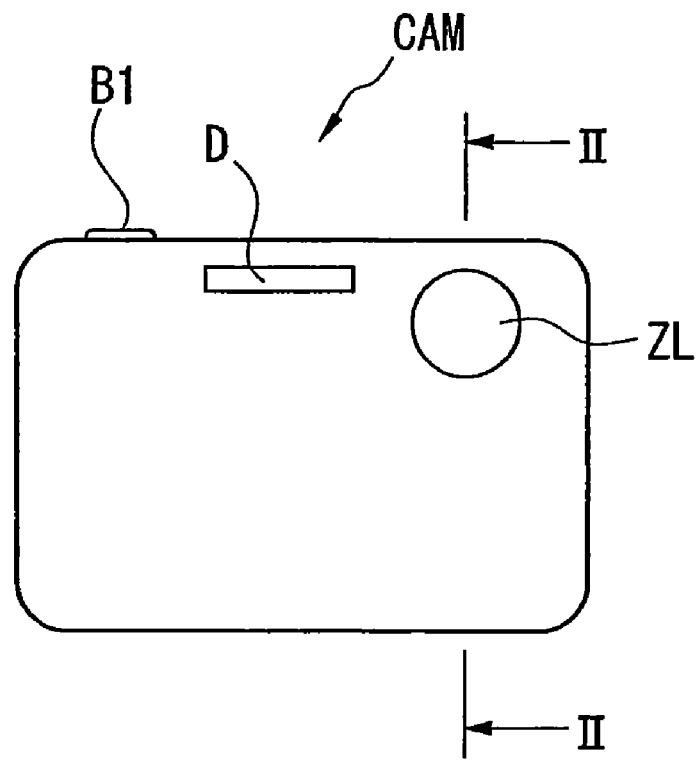
FIG. 1A is a front view of a digital still camera.
Figure 1B:
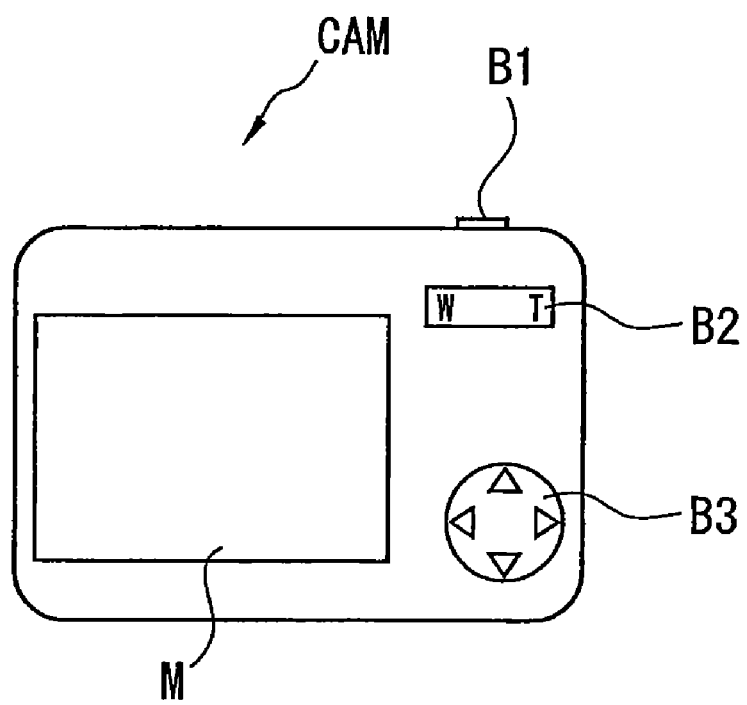
FIG. 1B is a rear view of the digital still camera.
Figure 2:
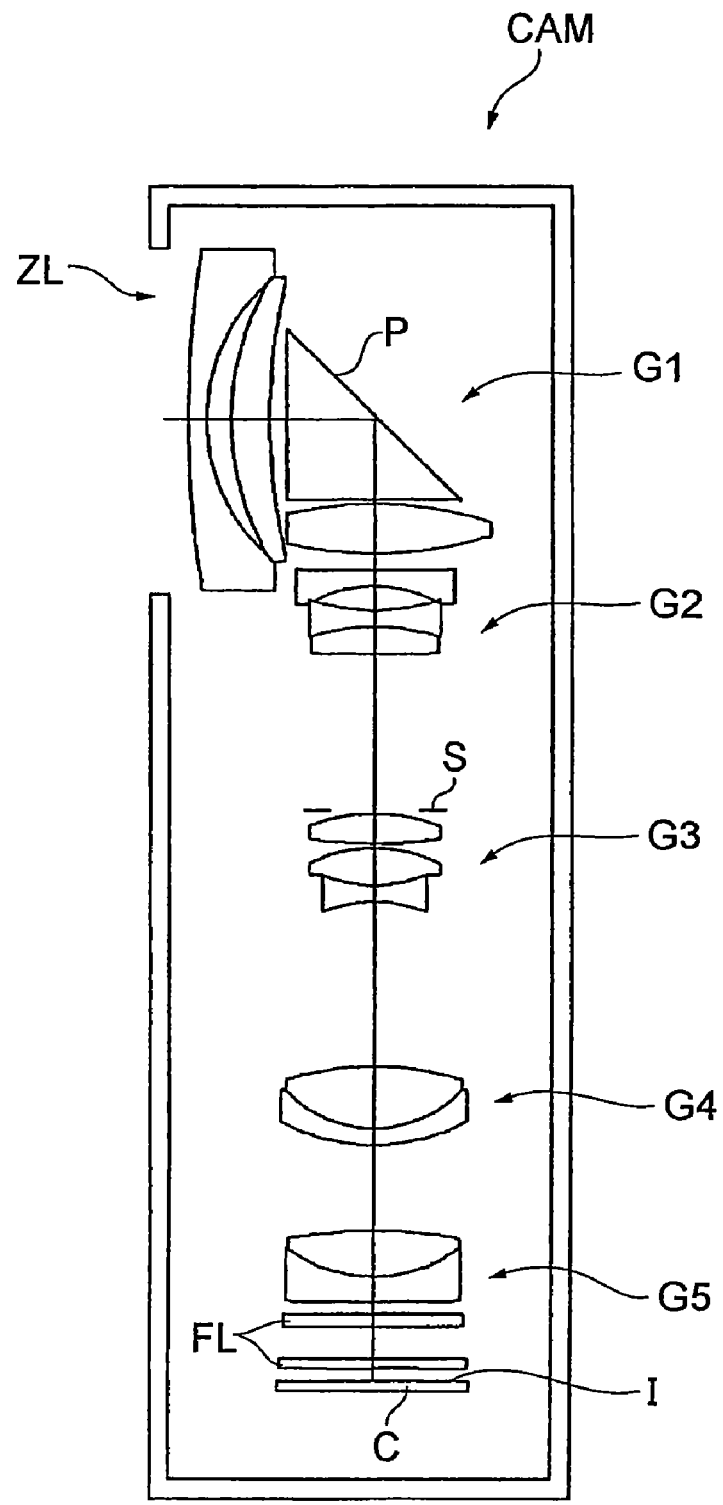
FIG. 2 is a cross-sectional view along II-II in FIG. 1A.

Preferred embodiments of the present invention will now be described with reference to the drawings. FIG. 1 shows a digital still camera CAM which has a zoom lens ZL according to the present embodiment. In FIG. 1, FIG. 1A shows a front view of the digital still camera, and FIG. 1B shows a rear view thereof. FIG. 2 is a cross-sectional view along II-II indicated by the arrow marks in FIG. 1A, and shows an overview of the later mentioned zoom lens ZL.

In the digital still camera CAM in FIG. 1 and FIG. 2, if a power button, which is not illustrated, is pressed, a shutter, which is not illustrated, of a camera lens (ZL) is released, and lights from an object are condensed by the camera lens (ZL), and an image is formed by an image sensing element C, which is disposed on an image surface I. An object image formed on an image sensing element C is displayed on a liquid crystal monitor M disposed on the back of the digital still camera CAM. The user determines the composition of the object image using the liquid crystal monitor M, then presses the release button B1 to capture the object image by the image sensing element C, and to store the image in a memory, which is not illustrated.

The camera lens is comprised of a zoom lens ZL according to the present embodiment, and since the optical axis of the light, which entered from the front face of the digital still camera CAM, is bent roughly 90 degrees downward (toward the bottom of the page in FIG. 2) by the optical axis bending element P in the zoom lens ZL, the digital still camera CAM can be slim. The digital still camera CAM further comprises an auxiliary light emission unit D that emits auxiliary light when the object is dark, a wide (W) tele (T) button B2 which is used when the zoom lens ZL is zoomed from the wide-angle end state (W) to the telephoto end state (T), and a function button B3 which is used for setting various conditions of the digital still camera CAM.

The zoom lens ZL of the present embodiment comprises a first lens group G1 which is disposed in order from an object and which has an optical axis bending element P and has a positive refractive power, a second lens group G2 which has a negative refractive power, a third lens group G3 which has a positive refractive power, a fourth lens group G4 which has a positive refractive power, and a fifth lens group G5 which has a negative refractive power, and an image on the image surface I can be shifted by shifting the entire third lens group G3 in a direction roughly perpendicular to the optical axis as a shift lens group.

Figure 3:
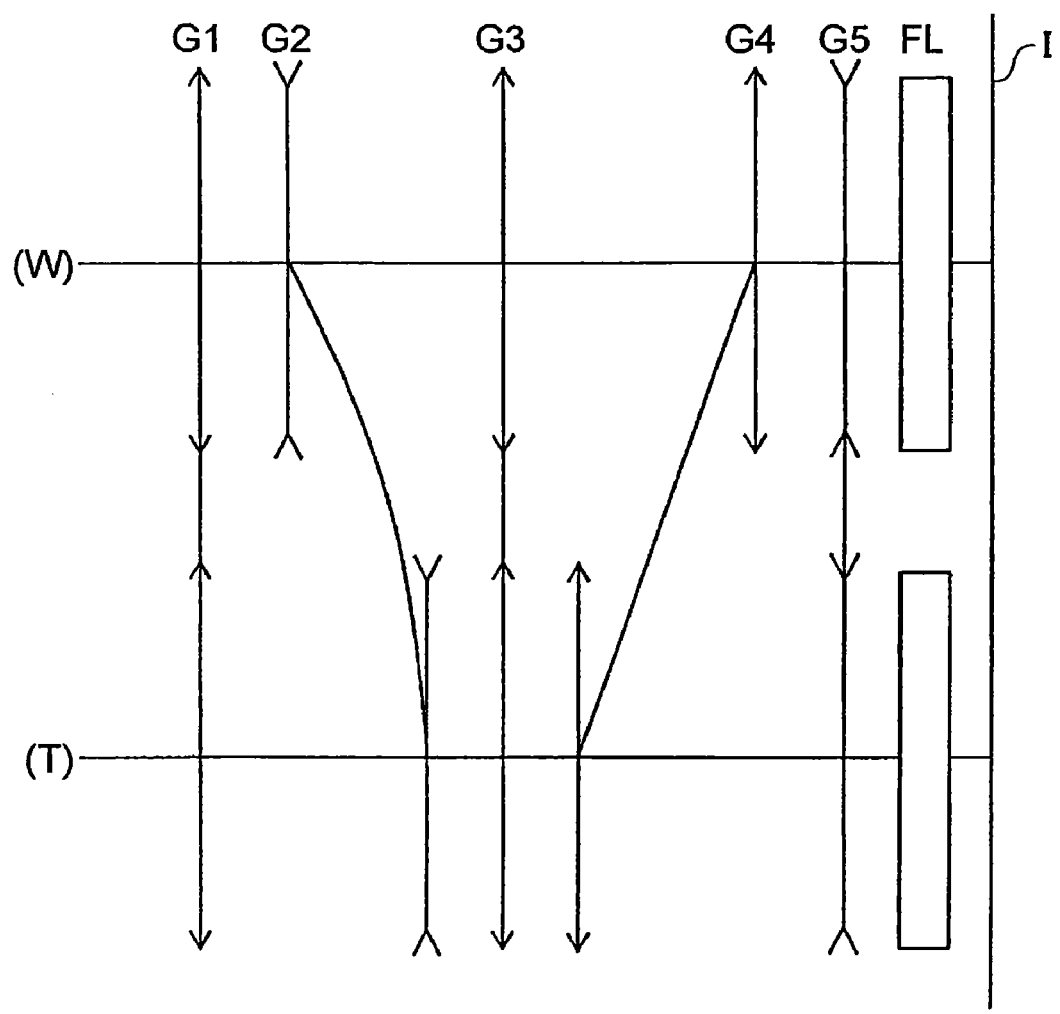
FIG. 3 is a diagram depicting a refractive power position in a zoom lens.

When a focal length changes from the wide-angle end state to the telephoto end state (zooming), the first lens group G1, the third lens group G3 and the fifth lens group G5 are fixed with respect to the image surface I, and the second lens group G2 and the fourth lens group G4 move along the optical axis, whereby the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 decreases (see FIG. 3). Between the zoom lens ZL and the image surface I, a filter group FL comprised of a low pass filter and an infrared cut filter, for example, is disposed.

The first lens group G1 is disposed closest to the object among the plurality of lens groups, which are disposed in order from the object, and is comprised of the optical axis bending element P for bending the optical axis, and a plurality of lens components which are disposed closer to an object than the optical axis bending element P, and has a function of bending the optical axis roughly 90 degrees and a function to converging the luminous flux. Constantly fixing the first lens group G1 during zooming from the wide-angle end state to the telephoto end state makes it unnecessary to move the lens group that is largest and heaviest among each lens group, and can simplify the structure of the zoom lens.

The second lens group G2 functions to expand an image of an object, which is formed by the first lens group G1, and changes the focal length by widening the distance between the first lens group G1 and the second lens group G2 as the wide-angle end state shifts to the telephoto end state, so as to increase the expansion ratio.

The third lens group G3 is comprised of a positive lens having a convex surface facing the object, and a cemented lens having a negative refractive power which has a positive lens having a convex surface facing the object and a negative lens having a concave surface facing the image, which are disposed in order from the object, and in the zoom lens ZL of the present embodiment, the image is shifted by shifting the entire lens group G3 in a direction roughly perpendicular to the optical axis as a shift lens group. In the third lens group G3, not the entire lens group, but only a part of the lens components constituting the lens group may be shifted in a direction roughly perpendicular to the optical axis. The third lens group G3 having this configuration functions to converge the luminous flux expanded by the second lens group G2. In order to improve the image quality when the lens is shifted, it is preferable that the third lens group G3 is comprised of a plurality of lens groups where the spherical aberration, sine condition and Petzval sum are well corrected. Correcting the spherical aberration and sine condition can suppress the decentration coma aberration, which is generated at the center area of the screen when the shift lens group is shifted roughly perpendicular to the optical axis. Also correcting the Petzval sum can suppress the curvature of field, which is generated in the peripheral area of the screen when the shift lens group is shifted roughly perpendicular to the optical axis.

The fourth lens group G4 has a function to further converge the luminous flux converged by the third lens group G3, and by actively changing the distance between the third lens group 3 and the fourth lens group G4 when zooming from the wide-angle end state to the telephoto end state, the fluctuation of the image surface with respect to the change of the focal length can be suppressed.

The fifth lens group G5 has a negative refractive power, whereby the refractive power from the first lens group G1 to the fourth lens group G4 can be enhanced. As a result, the total length of the zoom lens can be decreased. In order to implement higher performance, it is preferable that the fifth lens group G5 is comprised of a plurality of lens groups.

To implement a wider angle of view in this zoom lens ZL having a plurality of lens groups, it is preferable that the zoom lens ZL comprises a plurality of lens components which are disposed closer to the object than the optical refraction element P, and the plurality of lens components include at least one positive lens that satisfies the following expression (1) where vd is an Abbe number with respect to the d-line.

$$vd5 \tag{1}$$

By constructing the first lens group G1, as mentioned above, the structure can be simplified and the coma aberration and lateral chromatic aberration, which are generated in the first lens group G1 alone, can be well corrected. If the condition of conditional expression (1) is not satisfied, the lateral chromatic aberration, which is generated in the first lens group G1, deteriorates. In order to insure the effect of the present embodiment, it is preferable to set the lower limit value of conditional expression (1) to 55.0. To further insure the effect of the present embodiment, it is more preferable to set the lower limit value of conditional expression (1) to 60.0.

In the zoom lens ZL of the present embodiment, it is preferable that the following Expression (2) is satisfied, where βaw is a lateral magnification of the shift lens group in the wide-angle end state, and βbw is a lateral magnification of the zoom lens between the shift lens group and the image in the wide-angle end state, in order to minimize the change of image formation performance during lens shift.

$$0.7 < \beta bw \times (1 - \beta aw) < 1.4 \tag{2}$$

The numerator of conditional expression (2) is referred to as the "blur coefficient", which specifies an appropriate range for the moving amount of the image on the image surface I from the optical axis in the perpendicular direction with respect to the moving amount of the shift lens group in the wide-angle end state from the optical axis in a direction perpendicular to the optical axis. Concerning the blur coefficient, the shift amount Δ of the image with respect to the moving amount δ of the shift lens group, when the image on the image surface is shifted by moving the shift lens group in a direction roughly perpendicular to the optical axis, is given by the following Expression (A), $$\Delta = \delta \times (1 - \beta a) \times \beta b \tag{A}$$

When this Expression (A) is transformed, where βa is the lateral magnification of the shift lens group and βb is the lateral magnification by the lens group which is disposed closer to the image than the shift lens group, the following Expression (B) is obtained.

$$\Delta/\delta = (1 - \beta a) \times b \tag{B}$$

The right hand side (1−βa)×βb of expression (B) is referred to as a blur coefficient.

If the upper limit value of conditional expression (2) is exceeded, the moving amount of the image with respect to the moving amount of the shift lens group from the optical axis becomes too large, and the image moves considerably by a micro shift of the shift lens group, therefore the position control of the shift lens group becomes difficult, and sufficient accuracy cannot be implemented. Also the coma aberration and curvature of field deteriorate. If the lower limit value of conditional expression (2) is not reached, the moving amount of the image with respect to the moving amount of the shift lens group from the optical axis becomes relatively small, and the moving amount of the shift lens group that is required for cancelling the image blur, due to the motion blur, becomes extremely large. As a result, the size of the driving mechanism to move the shift lens group is increased, which makes downsizing of the lens diameter impossible. And the coma aberration also deteriorates.

In order to insure the effect of the present embodiment, it is preferable to set the upper limit value of conditional expression (2) to 1.35. To further insure the effect of the present embodiment, it is more preferable to set the upper limit value of conditional expression (2) to 1.30. And in order to insure the effect the present embodiment, it is preferable to set the lower limit value of conditional expression (2) to 0.75. To further insure the effect of the present embodiment, it is more preferable to set the lower limit value of conditional expression (2) to 0.80.

In the zoom lens ZL of the present embodiment, it is preferable that the plurality of lens components in the first lens group G1 are composed of two lenses, in order to implement a wider angle of view and higher performance. By constructing the first lens group G1 in this way, the structure can be simplified, and spherical aberration, which is generated in the first lens group G1 alone, can be well corrected with a minimum number of constituting lenses.

In the zoom lens ZL of the present embodiment, it is preferable that the plurality of lens components in the first lens group G1 are composed of a negative lens and a positive lens which are disposed in order from the object, in order to implement both higher performance and smaller size. By constructing the plurality of lens components in the first lens group G1 in this way, the structure can be simplified, and the spherical aberration and coma aberration, which are generated in the first lens group G1 alone, can be well corrected with the minimum number of constituting lenses. Also by combining the negative lens and a positive lens with a small diameter, which can match the concave portion of the negative lens, the first lens group G1 can be thin, and the size of the zoom lens can be decreased.

In the zoom lens ZL of the present embodiment, it is preferable that the plurality of lens components in the first lens group G1 are composed of a negative meniscus lens and a positive meniscus lens which are disposed in order from the object, in order to implement both an even higher performance and smaller size. By constructing the plurality of lens components in the first lens group G1 in this way, the structure can be simplified, and the spherical aberration and coma aberration, which are generated in the first lens group alone, can be well corrected with the minimum number of constituting lenses.

In the zoom lens ZL of the present embodiment, it is preferable that the shift lens group is fixed at zooming from the wide-angle end state to the telephoto end state. According to this configuration, complicating the drive mechanism to move the shift lens group can be prevented.

In the zoom lens ZL of the present embodiment, it is preferable that the shift lens group (the third lens group G3 in the case of the present embodiment) comprises a plurality of lens components. According to this configuration, the spherical aberration, which is generated in the shift lens group alone, can be well corrected, and the position of an exit pupil can be distant from the image surface I as much as possible.

In the zoom lens ZL of the present embodiment, it is preferable that the shift lens group comprises a cemented lens, in order to well correct the spherical aberration and axial chromatic aberration, which are generated in the shift lens group alone.

It is also preferable that a positive lens is added to the shift lens group. By this, the spherical aberration can be corrected even better.

In the zoom lens ZL of the present embodiment, it is preferable that the following Expression (3) is satisfied, where fw is the focal length of the zoom lens in the wide-angle end state, and fs is the focal length of the shift lens group.

$$0.3 < fw/fs < 0.5 \quad (3)$$

The conditional expression (3) specifies an appropriate focal length of the shift lens group. If the upper limit value of the conditional expression (3) is exceeded, the refractive power of the shift lens group becomes strong, and the spherical aberration, which is generated in the shift lens group alone, increases. If the lower limit value of the conditional expression (3) is not reached, the refractive power of the shift lens group becomes weak, and the shift lens group is no longer afocal, and as a result, the change of curvature of field increases when the lens is shifted.

In order to insure the effect of the present embodiment, it is preferable to set the upper limit value of conditional expression (3) to 0.49. To further insure the effect of the present embodiment, it is more preferable to set the upper limit value of conditional expression (3) to 0.46. In order to insure the effect of the present embodiment, it is preferable to set the lower limit value of conditional expression (3) to 0.31. To further insure the effect of the present embodiment, it is even more preferable to set the lower limit value of conditional expression (3) to 0.32.

In the zoom lens ZL of the present embodiment, it is preferable that the angle of view in the wide-angle end state is 75 degrees or more, or even more preferably 80 degrees or more. By this, the angle of view can be wide and flexibility in capturing images can be improved.

In the zoom lens ZL of the present embodiment, it is preferable that an aperture stop is disposed near the shift lens group, or near the object side of a lens component, which is closest to the object of the lens group including the shift lens group, in order to balance the further improvement of performance and deterioration of performance during left shift. Generally, a lens group which can shift the image can maintain image forming performance well by performing lens shift using a lens group which is close to a stop where an off axis luminous flux passes near the optical axis during zooming, in order to minimize deterioration of performance during lens shift. Therefore the third lens group G3 is used as the shift lens group in the zoom lens ZL of the present embodiment, but the present invention is not limited to this.

In zoom lens ZL of the present embodiment, it is preferable that the following Expression (4) is satisfied, where vd1 is an Abbe number, with respect to the d-line, of a negative lens closest to the object among the plurality of lens components.

$$vd1 < 50 \quad (4)$$

The conditional expression (4) is a conditional expression to specify an optical material characteristic of a negative lens which is disposed closest to the object among a plurality of lens components which are disposed closer to the object than the optical axis bending element P in the first lens group G1, so as to implement a good lateral chromatic aberration. If the condition of the conditional expression (4) is not satisfied, the lateral chromatic aberration, that is generated in the first lens group G1, deteriorates. In order to insure the effect of the present embodiment, it is preferable to set the upper limit value of conditional expression (4) to 45.0. To further insure the effect of the present embodiment, it is more preferable to set the upper limit value of the conditional expression (4) to 40.0. To even further insure the effect of the present embodiment, it is more preferable to set the upper limit value of the conditional expression (4) to 35.0.

In the zoom lens ZL of the present embodiment, it is preferable that the following Expression (5) is satisfied, where vd2 is an Abbe number, with respect to the d-line, of a positive lens closest to the image among the plurality of lens components.

$$vd2 > 50 \quad (5)$$

The conditional expression (5) is a conditional expression to specify an optical material characteristic of a positive lens which is disposed closest to the image among a plurality of lens components which are disposed closer to the object than the optical axis bending element P of the first lens group G1, so as to implement a good lateral chromatic aberration. If the condition of conditional expression (5) is not satisfied, the lateral chromatic aberration, that is generated in the first lens group G1, deteriorates. In order to insure the effect of the present embodiment, it is preferable to set the lower limit value of conditional expression (5) to 55.0. To further insure the effect of the present embodiment, it is more preferable to set the lower limit value of conditional expression (5) to 60.0.

In the zoom lens ZL of the present embodiment, it is preferable that the following Expression (6) is satisfied, where nd1 is a refractive index, with respect to the d-line, of a negative lens closest to the object among the plurality of lens components.

$$nd1 > 1.75 \quad (6)$$

The conditional expression (6) specifies an optical material characteristic of a negative lens which is disposed closer to the object than the optical axis bending element P of the first lens group G1, and is closest to the object.

If the conditional of the conditional expression (6) is not satisfied, the sizes of the effective diameter and outer diameter of the negative lens in the first lens group G1 increase, and the main body of the camera becomes large. Also correction of the coma aberration becomes difficult, and high optical performance can no longer be implemented. In order to insure the effect of the present embodiment, it is preferable to set the lower limit value of conditional expression (6) to 1.77. To further insure the effect of the present embodiment, it is more preferable to set the lower limit value of conditional expression (6) to 1.80.

In the zoom lens ZL of the present embodiment, it is preferable that the following Expression (7) is satisfied, where nd2 is a refractive index, with respect to the d-line, of a positive lens closest to the image of the plurality of lens components.

$$nd2 < 1.65 \quad (7)$$

The conditional expression (7) specifies an optical material characteristic of a positive lens which is disposed closer to the object than the optical axis bending element P in the first lens group G1, and is closest to the image. If the condition of conditional expression (7) is not satisfied, the coma aberration and lateral chromatic aberration, which are generated in the first group G1, deteriorate. In order to insure the effect of the present embodiment, it is preferable to set the lower limit value of conditional expression (7) to 1.63. To further insure the effect of the present embodiment, it is more preferable to set the lower limit value of conditional expression (7) to 1.59. To even further insure the effect of the present embodiment, it is more preferable to set the lower limit value of conditional expression (7) to 1.55.

In the zoom lens ZL of the present embodiment, it is preferable that the following Expression (8) is satisfied, where fw is a focal length of the zoom lens in the wide-angle end state, and f2 is a focal length of the second lens group.

$$0.4<(-f2)/fw<1.9 \qquad (8)$$

The conditional expression (8) specifies a range of an appropriate focal length of the second lens group G2. If the upper limit value of conditional expression (8) is exceeded, the refractive power of the second lens group G2 increases, and coma aberration and astigmatism, which are generated in the second lens group G2 alone, become too large, and the change of performance during photographing at a close distance increases. As a result, it becomes difficult to decrease the minimum photographing distance. If the lower limit value of the conditional expression (8) is not reached, the refractive power of the second lens group G2 becomes weak, and the moving amount to adjust the focal point increases, and the sizes of the elements of the drive system, which are required to move the lens, become large, which may interfere with other elements. If downsizing is attempted, spherical aberration deteriorates. As a result, saving space becomes difficult when the lens is installed in the main body of the camera.

In order to insure the effect of the present t, it is preferable to set the upper limit value of conditional expression (8) to 1.75. To further insure the effect of the present embodiment, it is more preferable to set the upper limit value of conditional expression (8) to 1.55. To even further insure the effect of the present embodiment, it is more preferable to set the upper limit value of conditional expression (8) to 1.45. In order to insure the effect of the present embodiment, it is preferable to set the lower limit value of conditional expression (8) to 0.60. To further insure the effect of the present embodiment, it is more preferable to set the lower limit value of conditional expression (8) to 0.70. To even further insure the effect of the present embodiment, it is more preferable to set the lower limit value of conditional expression (8) to 0.80.

In the zoom lens ZL of the present embodiment, it is preferable that the following Expression (9) is satisfied, where f1 is a focal length of the first lens group G1, and f2 is a focal length of the second lens group.

$$2.4<f1/(-f2)<3.7 \qquad (9)$$

The conditional expression (9) specifies an appropriate range of the focal length ratio between the first lens group G1 and the second lens group G2. If the upper limit value of conditional expression (9) is exceeded, the refractive power of the first lens group G1 becomes relatively weak, and the outer diameter of the entire first lens group G1 increases, which makes downsizing difficult. Also the refractive power of the second lens group G2 becomes relatively strong, and generation of coma aberration cannot be suppressed, and high optical performance cannot be implemented. If the lower limit value of conditional expression (9) is not reached, the refractive power of the first lens group G1 becomes relatively strong, which is advantageous for downsizing, but the spherical aberration and fluctuation of the curvature of field increase during zooming. Also the refractive power of the second lens group G2 becomes relatively weak, so this second lens group G2 cannot efficiently contribute to a variable power, and the moving amount required for variable power cannot be secured.

In order to insure the effect of the present embodiment, it is preferable to set the upper limit value of conditional expression (9) to 3.55. To further insure the effect of the present embodiment, it is more preferable to set the upper limit value of conditional expression (9) to 3.4. In order to insure the effect of the present embodiment, it is preferable to set the lower limit value of conditional expression (9) to 2.5. To further insure the effect of the present embodiment, it is more preferable to set the lower limit value of conditional expression (9) to 2.6. To even further insure the effect of the present embodiment, it is more preferable to set the lower limit value of conditional expression (9) to 2.7.

In the zoom lens ZL of the present embodiment, it is preferable that the following Expression (10) is satisfied, where the optical axis bending element P is a prism, L1 is a distance from the surface closest to the object of the first lens group G1 to the prism P, and Lp is a distance of the prism P on the optical axis.

$$L1/Lp<1.0 \qquad (10)$$

By satisfying conditional expression (10), the total length of the zoom lens can be short even if the plurality of lens components are disposed to the object of the optical axis bending element P, and it becomes possible to decrease size and thickness of the zoom lens ZL according to the present embodiment (zoom lens ZL).

In other words, conditional expression (10) specifies an appropriate range of the distance from the surface closest to the object of the first lens group G1 to the surface closest to the object of the optical axis bending element P on the optical axis, and the distance of the optical axis bending element P on the optical axis, and if the upper limit value of conditional expression (10) is exceeded, the total length of the lenses, which are disposed to the object of the optical axis bending element P, becomes long, and the thickness of the optical system increases. As a result, the thickness of the camera CAM increases, which makes it impossible to decrease size and thickness.

In order to insure the effect of the present embodiment, it is preferable to set the upper limit value of conditional expression (10) to 0.95. To further insure the effect of the present embodiment, it is more preferable to set the upper limit value of conditional expression (10) to 0.9. To even further insure the effect of the present embodiment, it is more preferable to set the lower limit value of conditional expression (10) to 0.85.

In the present embodiment, in order to prevent a failure of photographing due to an image blur caused by a motion blur, which tends to occur in a high variable power zoom lens, a blur detection system for detecting a blur of the zoom lens and drive means may be combined with the zoom lens, and all or a part of one lens group, among the lens groups constituting the zoom lens, is decentered with respect to the optical axis, as the shift lens group. By shifting an image on the image surface by driving the shift lens group using the drive means so that the image blur (change of image surface position) due to a blur of the zoom lens, which is detected by the blur detection system, is corrected, then the image blur can be corrected. The zoom lens ZL of the present embodiment can function as a so-called vibration proof optical system.

The zoom lens ZL of the present embodiment is comprised of five lens groups, but another lens group may be added between each lens group, or another lens group may be added adjacent to the image or the object of the lens group.

EXAMPLES

Each example of the present embodiment will now be described with reference to the accompanying drawings. As mentioned above, a zoom lens ZL according to each example comprises a first lens group G1 having a positive refractive power, a second lens group G2 having a negative refractive power, a third lens group G3 having a positive refractive power, a fourth lens group G4 having a positive refractive power, and a fifth lens group G5 having a negative refractive power, which are disposed in order from an object. Between the fifth lens group G5 and the image surface I, a filter group FL comprised of a low pass filter and infrared cut filter is disposed.

The third lens group G3 can move the entire lens group as a shift lens group in a direction roughly perpendicular to the optical axis, so as to enable the image shift in the zoom lens ZL. The present invention, however, is not limited to this, but the third lens group G3 may shift not the entire lens group, but only a part of the lens components constituting the lens group in a direction roughly perpendicular to the optical axis.

In the zoom lens ZL, as FIG. 3 shows, the second lens group G2 and the fourth lens group G4 move along the optical axis, and the first lens group G1, the third lens group G3 and the fifth lens group G5 are fixed with respect to the image surface I during zooming from a wide-angle end state to a telephone end state. At this time, the distance of the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. FIG. 3 shows the movement of each lens group in the zoom lens GL according to each example, when the refractive power is allocated and the focal length state changes (zooming) from the wide-angle end state (W) to the telephoto end state (T).

Table 1 to Table 4 are shown below, which are tables of each data of Example 1 to Example 4. In each table, f is a focal length, FNO is an F number, 2ω is an angle of view, and Bf is a back focus. The surface number shows a sequence of the lens surfaces which are disposed in order from an object in a light traveling direction (hereafter called "surface number"), a surface distance is a distance from each optical surface to the next optical surface (or image surface) on the optical axis, and the refractive index and the Abbe number show values with respect to the d-line (wavelength: 587.6 nm).

In the tables, "mm" is generally used as a unit for focal length f, radius of curvature, surface distance, and other lengths. However, the unit is not limited to "mm", but another appropriate unit can be used since similar optical performance can be implemented even if the optical system is proportionally expanded or reduced. And in the tables, "0.0000" of the radius of curvature indicates a plane, and the entry of refractive index "1.00000" of air is omitted.

In the tables, an aspherical surface with "*" is given by the following Expression (c), where y is height in a direction perpendicular to the optical axis, S (y) is a distance (sag amount) along the optical axis from the tangential plane at the vertex of the aspherical surface to the position on the aspherical surface at height y, r is a radius of curvature (paraxial radius of curvature) of the reference spherical surface, K is a conical coefficient, and An is an aspherical coefficient of degree n. In each example, the secondary aspherical coefficient A2 is 0, and entry thereof is omitted. En indicates×10$^n$. For example, 1.234E-05=1.234×10$^{-5}$.

$$S(y)=(y^2/r)/[1+(1-K\cdot y^2/r^2)^{1/2}]+A2 \times y^2+A4 \times y^4+A6 \times y^6+A8 \times y^8+A10 \times y^{10} \quad (C)$$

Example 1

Figure 4:
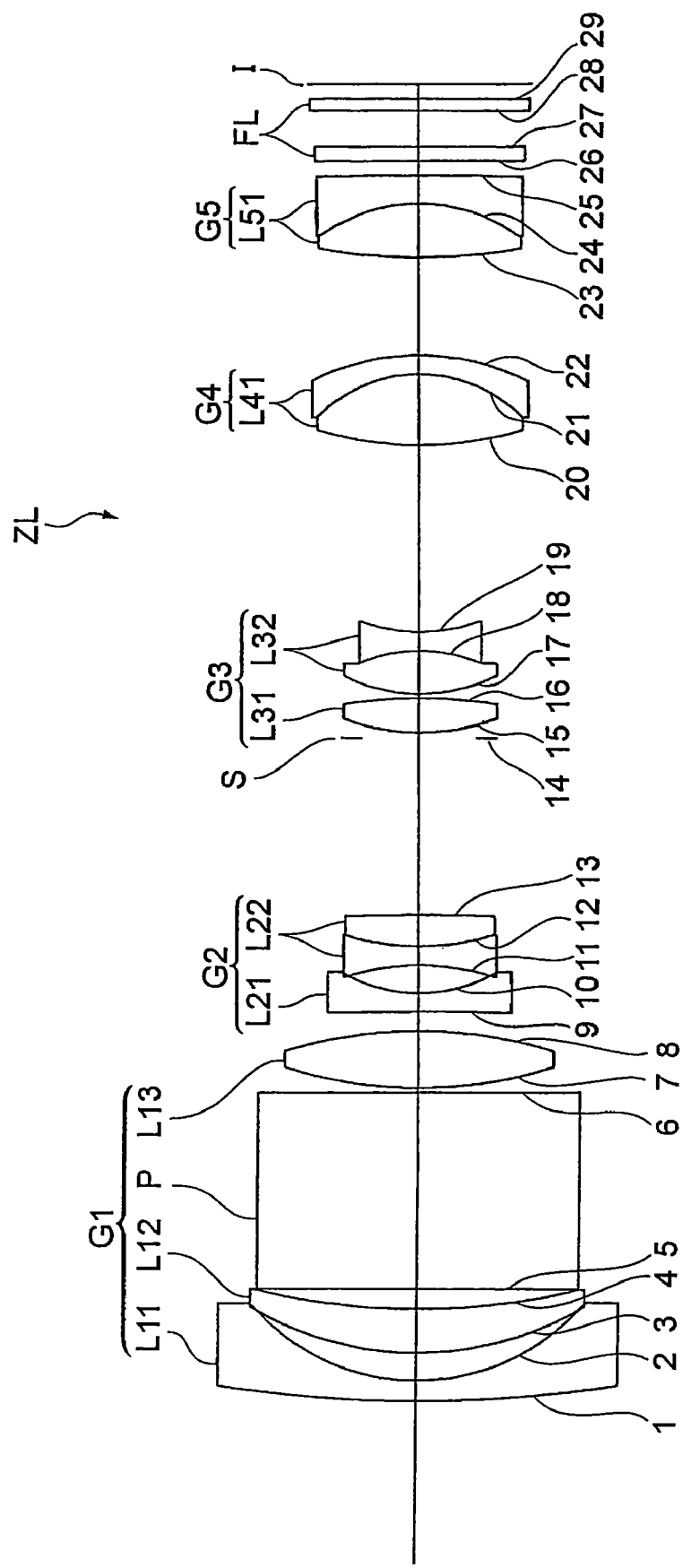
FIG. 4 is a cross-sectional view depicting a zoom lens according to Example 1.

Example 1 of the present embodiment will now be described with reference to FIG. 4 to FIG. 7 and Table 1. FIG. 4 is a diagram depicting a configuration of a zoom lens ZL (in a wide-angle end state) according to Example 1 (the optical axis bending element P is shown in an expanded state).

In the zoom lens ZL in FIG. 4, a first lens group G1 is comprised of a negative meniscus lens L11 having a convex surface facing an object, a positive meniscus lens L12 having a convex surface facing the object, an optical axis bending element P, such as a rectangular prism, for bending the optical axis to about 90 degrees, and a biconvex positive lens L13 having an aspherical surface on both sides, which are disposed in order from the object. A second group G2 is comprised of a biconcave negative lens L21 having an aspherical surface to an image side, and a negative cemented lens L22 where a biconcave negative lens and a biconvex positive lens are bonded, which are disposed in order from the object. A third lens group G3 is comprised of a biconvex positive lens L31 having an aspherical surface to the object, and a negative cemented lens L32 where a positive meniscus lens having a convex surface facing the object and a negative meniscus lens having a concave surface facing the image are bonded, which are disposed in order from the object. For the motion blur correction, the third lens group G3 is moved (shifted) in a direction roughly perpendicular to the optical axis, as mentioned above, so that the image is shifted on the image surface I when a motion blur occurs. A fourth lens group G4 is comprised of a positive cemented lens L41 where a biconvex positive lens having an aspherical surface to the object and a negative meniscus lens having a convex surface facing the image, are bonded. A fifth lens group G5 is comprised of a negative cemented lens L51, where a biconvex positive lens and a negative meniscus lens having a convex surface facing the object, are bonded. A filter group FL is disposed between the fifth lens group G5 and the image surface I.

The image surface I is formed on the image sensing element, which is not illustrated, and this image sensing element is comprised of a CCD and CMOS (this is also the same for the examples described herein below). An aperture stop S is disposed in the third lens group G3, and is fixed with respect to the image surface I during zooming from the wide-angle end state to the telephoto end state.

Table 1 shows the data of Example 1. The surface numbers 1 to 29 in Table 1 correspond to the surfaces 1 to 29 in FIG. 4. In Example 1, each lens surface of the seventh, eighth, tenth, fifteenth and twentieth surface is formed in an aspherical shape.

In the table, d8 is an axial air distance between the first lens group G1 and the second lens group G2, d13 is an axial air distance between the second lens group G2 and the third lens group G3, d19 is an axial air distance between the third lens group G3 and the fourth lens group G4, and d22 is an axial air distance between the fourth lens group G4 and the fifth lens group G5. These axial air distances d8, d13, d19 and d22 change during zooming. The table values corresponding to the above mentioned conditional expressions (1) to (10), that is the condition correspondence values, are also shown.

TABLE 1

| [All parameters] | | | | | |
|---|---|---|---|---|---|
| | Wide-angle end | | intermediate focal length | | telephoto end |
| f = | 5.17 | to | 11.05 | to | 17.25 |
| F.No = | 3.79 | to | 4.20 | to | 4.98 |
| 2ω = | 80.07 | to | 39.64 | to | 25.73 |
| Image height = | 4.05 | to | 4.05 | to | 4.05 |
| Total lens length = | 55.40 | to | 55.40 | to | 55.40 |

[Lens parameters]

| Surface number | Radius of curvature | Surface distance | Refractive index | Abbe number |
|---|---|---|---|---|
| 1 | 53.1535 | 0.85 | 1.84666 | 23.78 |
| 2 | 9.0578 | 1.14 | | |
| 3 | 13.4761 | 1.81 | 1.49700 | 81.54 |
| 4 | 28.2319 | 0.83 | | |
| 5 | 0.0000 | 8.20 | 1.83481 | 42.71 |
| 6 | 0.0000 | 0.20 | | |
| 7* | 17.0331 | 2.40 | 1.76802 | 49.24 |
| 8* | −18.1329 | (d8) | | |
| 9 | −252.7177 | 0.80 | 1.83441 | 37.28 |
| 10* | 6.1877 | 1.17 | | |
| 11 | −9.5427 | 0.80 | 1.75500 | 52.32 |
| 12 | 10.0818 | 1.32 | 1.92286 | 18.90 |
| 13 | −96.4453 | (d13) | | |
| 14 | 0.0000 | 0.20 | | (aperture stop S) |
| 15* | 8.6457 | 1.45 | 1.74330 | 49.32 |
| 16 | −21.2915 | 0.20 | | |
| 17 | 6.7323 | 1.82 | 1.58313 | 59.37 |
| 18 | −6.1296 | 0.80 | 1.88300 | 40.76 |
| 19 | 6.7554 | (d19) | | |
| 20* | 12.9217 | 3.00 | 1.59201 | 67.02 |
| 21 | −5.7000 | 0.80 | 1.84666 | 23.78 |
| 22 | −9.4333 | (d22) | | |
| 23 | 23.5838 | 2.23 | 1.48749 | 70.23 |
| 24 | −6.7713 | 1.20 | 1.90366 | 31.31 |
| 25 | −177.2712 | 0.60 | | |
| 26 | 0.0000 | 0.60 | 1.54437 | 70.51 |
| 27 | 0.0000 | 1.50 | | |
| 28 | 0.0000 | 0.50 | 1.51633 | 64.14 |
| 29 | 0.0000 | (Bf) | | |

[Focal length of each lens group]

| Group | Starting surface | Focal length |
|---|---|---|
| 1 | 1 | 14.6088 |
| 2 | 9 | −5.1081 |
| 3 | 15 | 11.9087 |
| 4 | 20 | 11.5198 |
| 5 | 23 | −29.5649 |

[Aspherical surface data]

| Surface number | K | A4 | A6 | A8 | A10 |
|---|---|---|---|---|---|
| 7 | +2.1186 | −1.2250E−04 | +2.4800E−06 | −1.0975E−07 | −2.2767E−09 |
| 8 | −6.6722 | −1.7284E−04 | +3.8696E−06 | −1.1935E−07 | +2.2733E−09 |
| 10 | −7.5870 | +4.1078E−03 | −2.6754E−04 | +1.2906E−05 | −1.1196E−07 |
| 15 | −8.9260 | +1.9632E−03 | −8.5037E−05 | +5.8409E−06 | −2.3851E−07 |
| 20 | −2.4156 | −9.4016E−05 | +1.0613E−05 | −7.4403E−07 | +2.1518E−08 |

[Variable distance]

| | Wide-angle end | intermediate focal length | telephoto end |
|---|---|---|---|
| F | 5.1700 | 11.0537 | 17.2500 |
| d8 | 0.8000 | 5.5036 | 7.1424 |
| d13 | 7.5424 | 2.8387 | 1.2000 |
| d19 | 7.9283 | 3.6819 | 1.0248 |

TABLE 1-continued

| d22 | 4.1114 | 8.3578 | 11.0146 |
|---|---|---|---|
| Bf | 0.5999 | 0.5999 | 0.6003 |

| [Condition mapping values] |
|---|
| $vd = 81.54$ |
| $\beta aw = -9.4502$ |
| $\beta bw = 0.1048$ |
| $vd1 = 23.78$ |
| $vd2 = 81.54$ |
| $nd1 = 1.84666$ |
| $nd2 = 1.49700$ |
| $fw = 5.1700$ |
| $f1 = 14.6088$ |
| $f2 = -5.1081$ |
| $fs = 11.9087$ |

| | |
|---|---|
| Conditional expression (1) | $vd (=vd2) = 81.54$ |
| Conditional expression (2) | $\beta bw \times (1 - \beta aw) = 1.0953$ |
| Conditional expression (3) | $fw/fs = 0.4341$ |
| Conditional expression (4) | $vd1 = 23.78$ |
| Conditional expression (5) | $vd2 = 81.54$ |
| Conditional expression (6) | $nd1 = 1.84666$ |
| Conditional expression (7) | $nd2 = 1.49700$ |
| Conditional expression (8) | $(-f2)/fw = 0.9880$ |
| Conditional expression (9) | $f1/(-f2) = 2.8599$ |
| Conditional expression (10) | $L1/Lp = 0.56$ |

As the data table in Table 1 shows, the zoom lens ZL of the present example satisfies all conditional expressions (1) to (10).

Figure 5A:
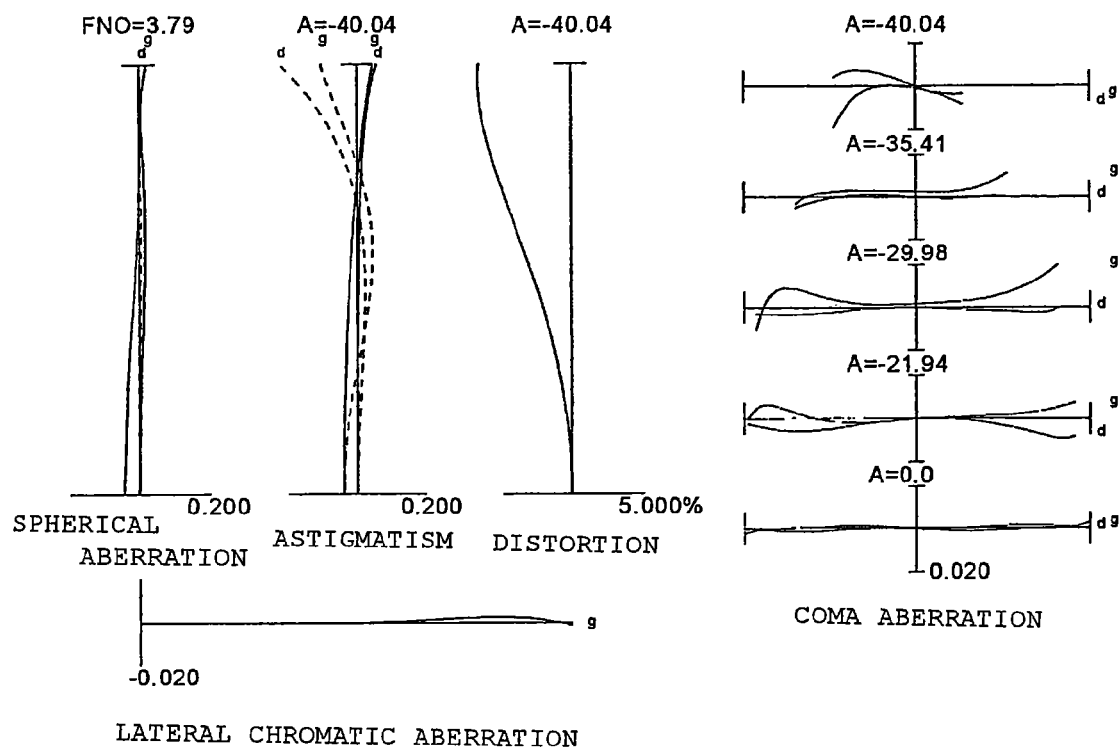
FIG. 5A are graphs showing various aberrations of the zoom lens according to Example 1 upon focusing on infinity in the wide-angle end state.
Figure 5B:
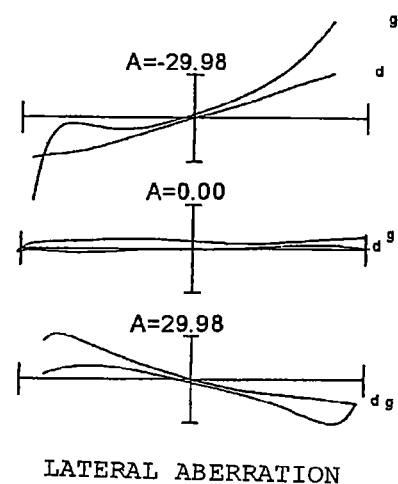
FIG. 5B is a graph showing lateral aberration of the zoom lens upon lens shifting in the wide-angle end state.
Figure 6A:
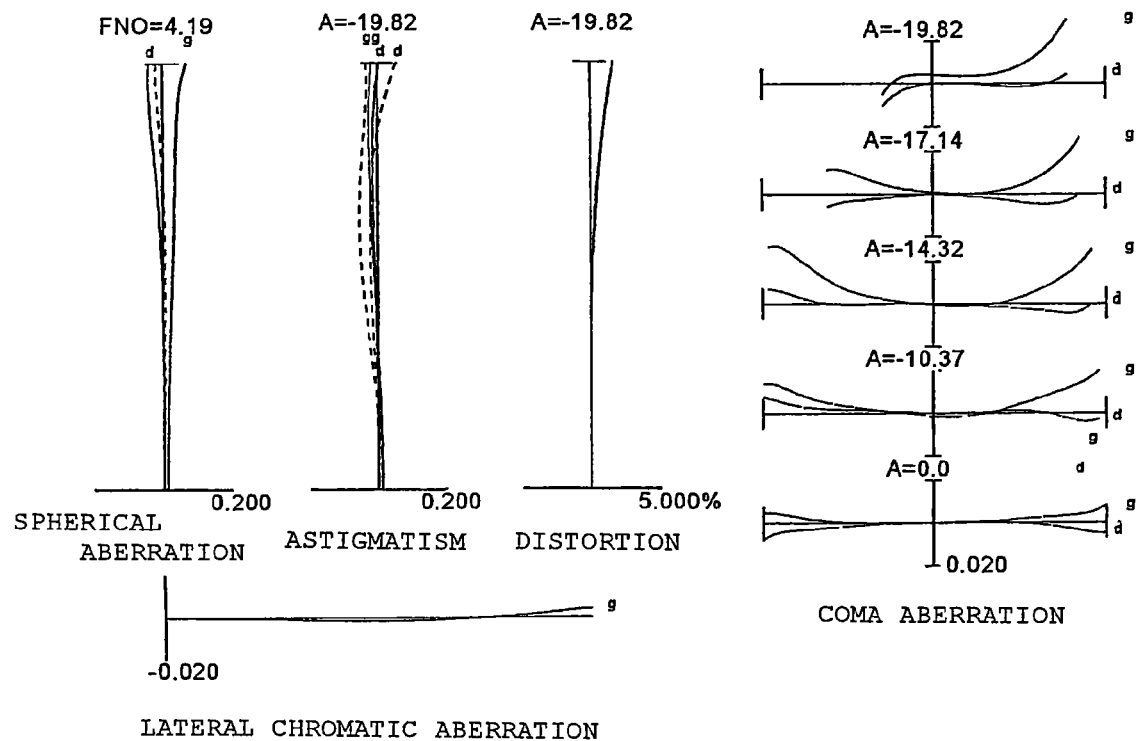
FIG. 6A are graphs showing various aberrations of the zoom lens according to Example 1 upon focusing on infinity in the intermediate focal length state.
Figure 6B:
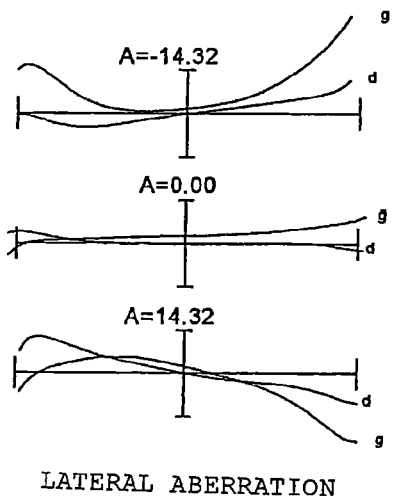
FIG. 6B is a graph showing lateral aberration of the zoom lens upon lens shifting in the intermediate focal length state.
Figure 7A:
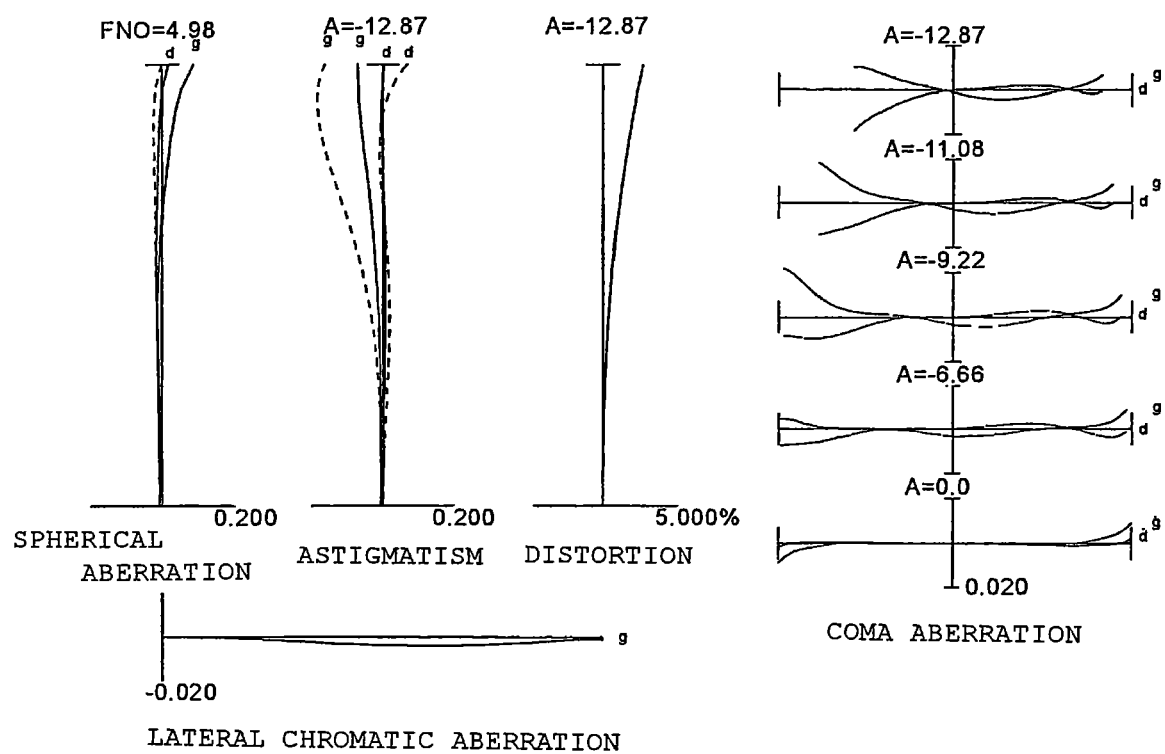
FIG. 7A are graphs showing various aberrations of the zoom lens according to Example 1 upon focusing on infinity in the telephoto end state.
Figure 7B:
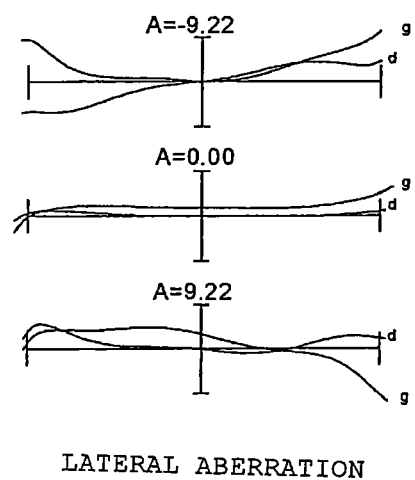
FIG. 7B is a graph showing lateral aberration upon lens shifting in the telephoto end state.

FIG. 5 to FIG. 7 are graphs showing various aberrations of the zoom lens according to Example 1 with respect to the d-line (wavelength: 587.6 nm) and g-line (wavelength: 435.8 nm). In other words, FIG. 5A shows graphs of various aberrations of the zoom lens upon focusing on infinity in the wide-angle end state (f=5.17 mm), FIG. 5B shows a graph of various lateral aberrations when the lens is shifted in the wide-angle end status (f=5.17 mm), FIG. 6A shows graphs of various aberrations of the zoom lens upon focusing on infinity in the intermediate focal length state (f=11.05 mm), FIG. 6B shows a graph of a lateral aberration when the lens is shifted in the intermediate focal length state (f=11.05 mm), FIG. 7A shows graphs of various aberrations of the zoom lens upon focusing on infinity in the telephoto end state (f=17.25 mm), and FIG. 7B shows a graph of a lateral aberration when the lens is shifted in the telephoto end state (f=17.25 mm).

In each aberration graph, FNO is an F number, Y is an image height, and A is a half angle view with respect to each image height. In the graphs showing astigmatism, the solid line indicates a sagittal image surface, and the broken line indicates a meridional image surface. In the graphs showing aspherical aberration, the solid line indicates the spherical aberration, and the broken line indicates the sine condition. The above description on aberration graphs is the same for the other examples.

As each aberration graph shows, in Example 1, various aberrations are well corrected in each focal length state from the wide-angle end state to the telephoto end state, and excellent image forming performance is implemented.

By installing the zoom lens ZL of Example 1, excellent optical performance can also be insured for a digital still camera (optical apparatus, see FIG. 1 and FIG. 2), and the method for forming an image of an object according to the present embodiment.

Example 2

Figure 8:
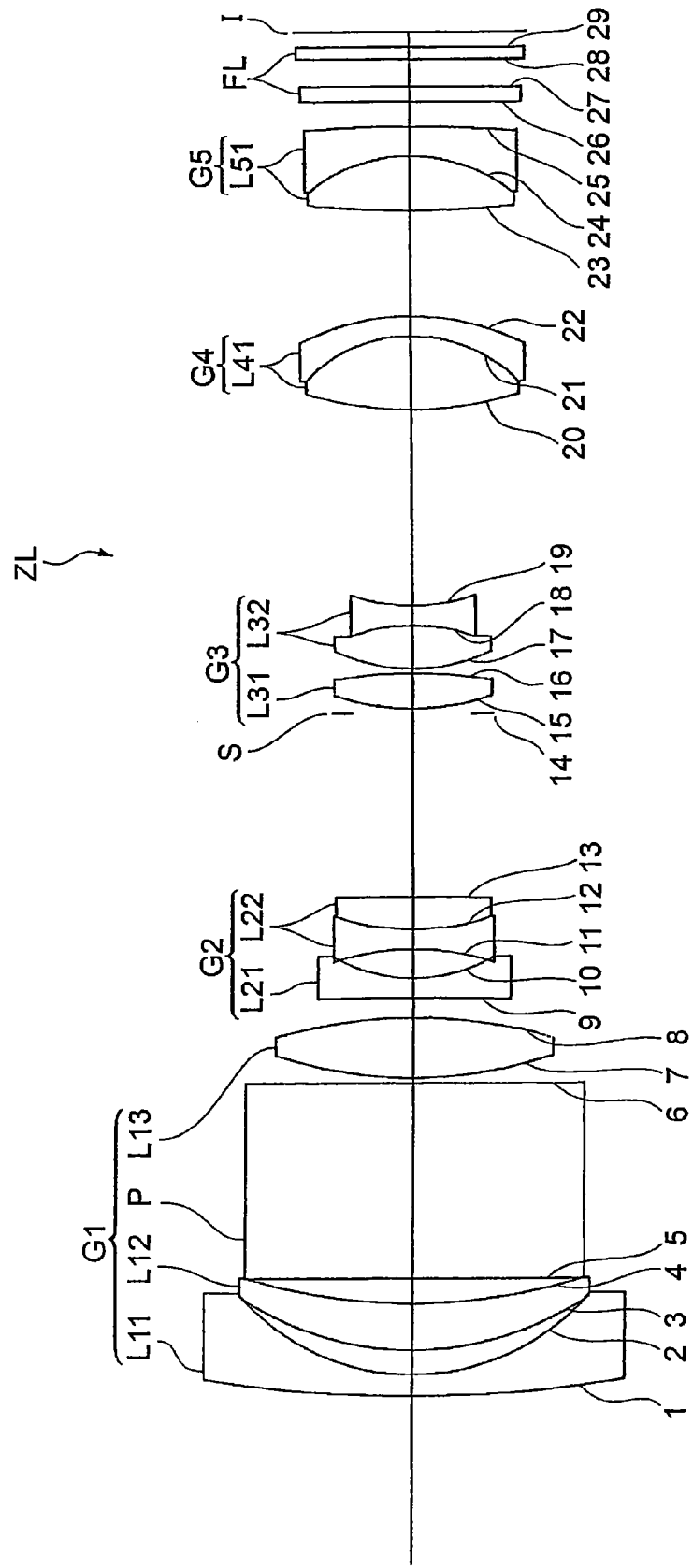
FIG. 8 is a cross-sectional view depicting a zoom lens according to Example 2.

Example 2 of the present embodiment will now be described with reference to FIG. 8 to FIG. 11 and Table 2. FIG. 8 is a diagram depicting a configuration of a zoom lens ZL (in a wide-angle end state) according to Example 2. The zoom lens ZL of Example 2 has a similar configuration as Example 1, so each composing element is denoted with the same reference symbol as Example 1, for which detailed description is omitted.

Table 2 shows each data of Example 2. The surface numbers 1 to 29 in Table 2 correspond to the surfaces 1 to 29 in FIG. 8. In Example 2, each lens surface of the seventh, eighth, tenth, fifteenth and twentieth surface are formed in an aspherical shape.

In the table, d8 is an axial air distance between the first lens group G1 and the second lens group G2, d13 is an axial air distance between the second lens group G2 and the third lens group G3, d19 is an axial air distance between the third lens group G3 and the fourth lens group G4, and d22 is an axial air distance between the fourth lens group G4 and the fifth lens group G5. These axial air distances d8, d13, d19 and d22 change during zooming. In the table, values corresponding to the above mentioned conditional expressions (1) to (10), that is condition correspondence values, are also shown.

TABLE 2

| [All parameters] | | | | |
|---|---|---|---|---|
| | Wide-angle end | | intermediate focal length | | telephoto end |
| f = | 5.17 | to | 11.21 | to | 17.25 |
| F.No = | 3.76 | to | 4.16 | to | 4.94 |
| 2ω = | 80.08 | to | 39.15 | to | 25.73 |

TABLE 2-continued

| Image height = | 4.05 | to | 4.05 | to | 4.05 |
|---|---|---|---|---|---|
| Total lens length = | 55.00 | to | 55.00 | to | 55.00 |

[Lens parameters]

| Surface number | Radius of curvature | Surface distance | Refractive index | Abbe number |
|---|---|---|---|---|
| 1 | 50.9922 | 0.85 | 1.84666 | 23.78 |
| 2 | 9.1552 | 0.97 | | |
| 3 | 12.3231 | 1.84 | 1.48794 | 70.23 |
| 4 | 22.7877 | 1.00 | | |
| 5 | 0.0000 | 7.80 | 1.83400 | 37.16 |
| 6 | 0.0000 | 0.20 | | |
| 7* | 15.8341 | 2.43 | 1.76802 | 49.24 |
| 8* | −19.4682 | (d8) | | |
| 9 | −224.1818 | 0.80 | 1.83441 | 37.28 |
| 10* | 6.1045 | 1.17 | | |
| 11 | −9.7846 | 0.80 | 1.75500 | 52.32 |
| 12 | 9.5561 | 1.32 | 1.92286 | 18.90 |
| 13 | −172.7064 | (d13) | | |
| 14 | 0.0000 | 0.20 | | (aperture stop S) |
| 15* | 9.1281 | 1.43 | 1.74330 | 49.32 |
| 16 | −20.0318 | 0.20 | | |
| 17 | 6.9066 | 1.76 | 1.58313 | 59.37 |
| 18 | −7.0086 | 0.80 | 1.88300 | 40.76 |
| 19 | 6.9729 | (d19) | | |
| 20* | 12.6494 | 3.00 | 1.59201 | 67.02 |
| 21 | −5.7000 | 0.80 | 1.84666 | 23.78 |
| 22 | −9.4395 | (d22) | | |
| 23 | 37.3111 | 2.17 | 1.48749 | 70.23 |
| 24 | −6.3001 | 1.18 | 1.90366 | 31.31 |
| 25 | −54.4048 | 1.00 | | |
| 26 | 0.0000 | 0.60 | 1.54437 | 70.51 |
| 27 | 0.0000 | 1.10 | | |
| 28 | 0.0000 | 0.50 | 1.51633 | 64.14 |
| 29 | 0.0000 | (Bf) | | |

[Focal length of each lens group]

| Group | Starting surface | Focal length |
|---|---|---|
| 1 | 1 | 14.8895 |
| 2 | 9 | −4.9811 |
| 3 | 15 | 11.9300 |
| 4 | 20 | 11.4136 |
| 5 | 23 | −28.6508 |

[Aspherical surface data]

| Surface number | K | A4 | A6 | A8 | A10 |
|---|---|---|---|---|---|
| 7 | +3.5697 | −1.8926E−04 | +2.5173E−06 | −1.4034E−07 | +2.4381E−09 |
| 8 | −8.3113 | −1.8575E−04 | +4.9028E−06 | −1.5810E−07 | +2.7804E−09 |
| 10 | −9.0000 | +5.0868E−03 | −4.3832E−04 | +3.0880E−05 | −9.0219E−07 |
| 15 | −0.3576 | +1.8906E−04 | +2.7660E−05 | −3.5720E−06 | +2.0181E−07 |
| 20 | +0.4383 | −2.3841E−04 | +5.9719E−06 | −1.4096E−07 | +2.2681E−10 |

[Variable distance]

| | Wide-angle end | intermediate focal length | telephoto end |
|---|---|---|---|
| F | 5.1700 | 11.2098 | 17.2492 |
| d8 | 0.8000 | 5.5202 | 7.0423 |
| d13 | 7.4419 | 2.7214 | 1.2000 |
| d19 | 7.9695 | 3.6539 | 1.0129 |
| d22 | 4.2568 | 8.5720 | 11.2124 |
| Bf | 0.5977 | 0.5980 | 0.5975 |

[Condition mapping values]

$\nu d = 70.23$
$\beta aw = -9.8459$
$\beta bw = 0.1018$
$\nu d1 = 23.78$
$\nu d2 = 70.23$
$nd1 = 1.84666$
$nd2 = 1.48749$
$fw = 5.1700$ TABLE 2-continued f1 = 14.8895
f2 = −4.9811
fs = 11.9300

| | |
|---|---|
| Conditional expression (1) | νd (=νd2) = 70.23 |
| Conditional expression (2) | βbw × (1 − βaw) = 1.1043 |
| Conditional expression (3) | fw/fs = 0.4334 |
| Conditional expression (4) | νd1 = 23.78 |
| Conditional expression (5) | νd2 = 70.23 |
| Conditional expression (6) | nd1 = 1.84666 |
| Conditional expression (7) | nd2 = 1.48749 |
| Conditional expression (8) | (−f2)/fw = 0.9635 |
| Conditional expression (9) | f1/(−f2) = 2.9892 |
| Conditional expression (10) | L1/Lp = 0.60 |

As the data table in Table 2 shows, the zoom lens ZL of the present example satisfies all the conditional expressions (1) to (10).

Figure 9A:
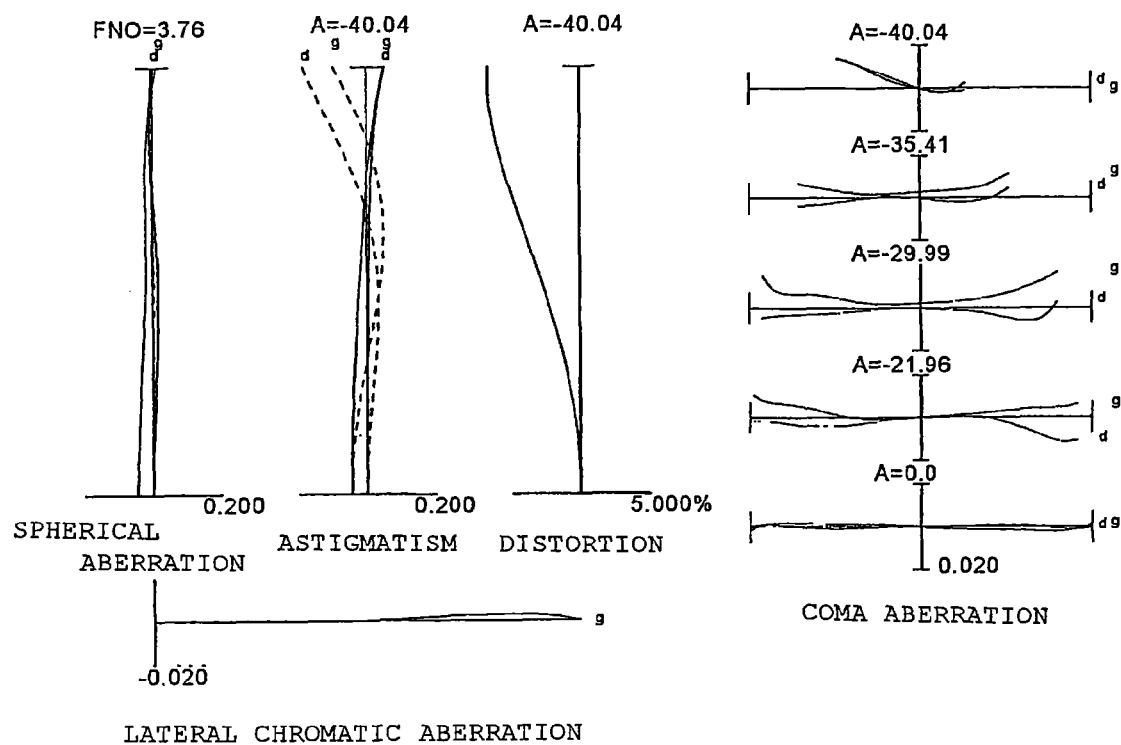
FIG. 9A are graphs showing various aberrations of the zoom lens according to Example 2 upon focusing on infinity in the wide-angle end state.
Figure 9B:
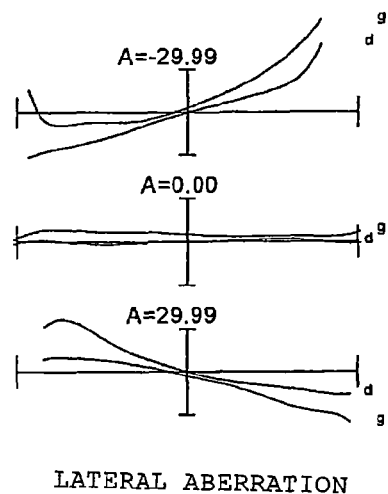
FIG. 9B is a graph showing lateral aberration of the zoom lens upon lens shifting in the wide-angle end state.
Figure 10A:
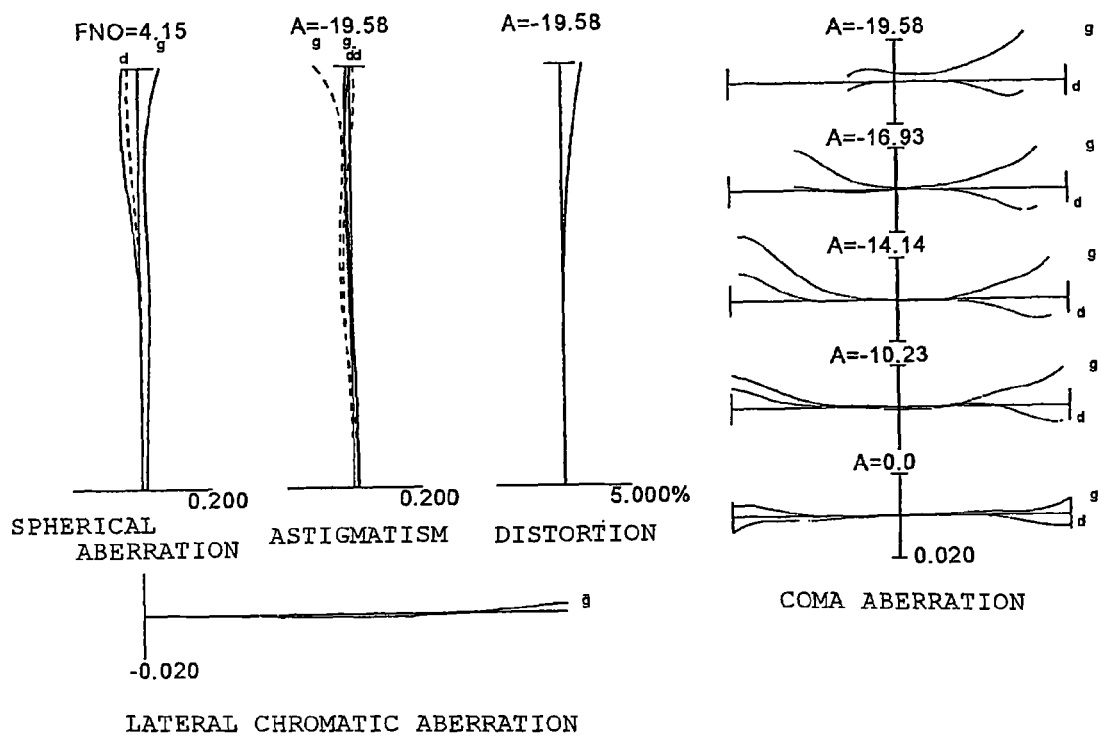
FIG. 10A are graphs showing various aberrations of the zoom lens according to Example 2 upon focusing on infinity in the intermediate focal length state.
Figure 10B:
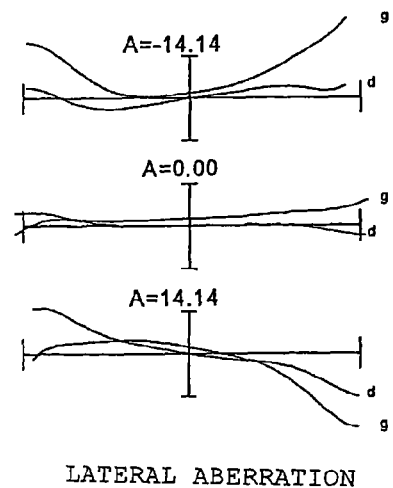
FIG. 10B is a graph showing lateral aberration of the zoom lens upon lens shifting in the intermediate focal length state.
Figure 11A:
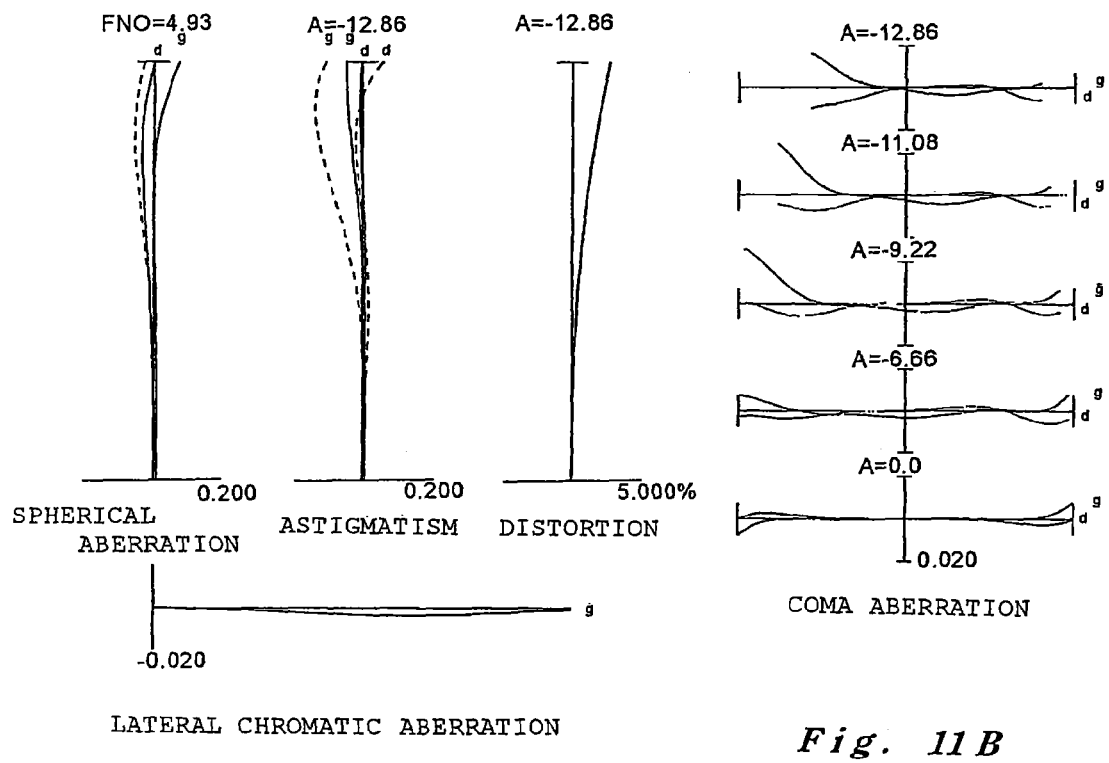
FIG. 11A are graphs showing various aberrations of the zoom lens according to Example 2 upon focusing on infinity in the telephoto end state.
Figure 11B:
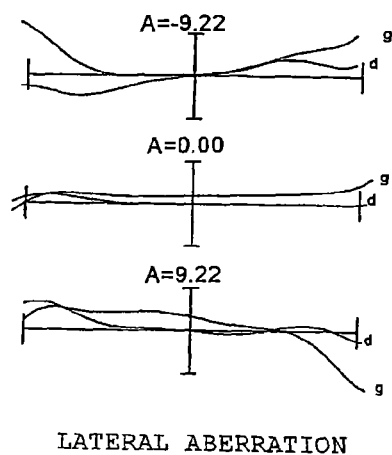
FIG. 11B is a graph showing lateral aberration upon lens shifting in the telephoto end state.

FIG. 9 to FIG. 11 are graphs showing various aberrations of the zoom lens according to Example 2 with respect to the d-line (wavelength: 587.6 nm) and g-line (wavelength: 435.8 nm). In other words, FIG. 9A are graphs showing various aberrations of the zoom lens upon focusing on infinity in the wide-angle end state (f=5.17 mm), FIG. 9B is a graph showing lateral aberration when the lens is shifted in the wide-angle end state (f=5.17 mm), FIG. 10A are graphs showing various aberrations of the zoom lens upon focusing on infinity in the intermediate focal lens state (f=11.21 mm), FIG. 10B is a graph showing a lateral aberration when the lens is shifted in the intermediate focal length state (f=11.21 mm), FIG. 11A are graphs showing various aberrations of the zoom lens upon focusing on infinity in the telephoto end state (f=17.25 mm), and FIG. 11B is a graph showing a lateral aberration when the lens is shifted in the telephoto end state (f=17.25 mm).

As each aberration graph shows, in Example 2, various aberrations are well corrected in each focal length state from the wide-angle end state to the telephoto end state, and excellent image forming performance is implemented.

By installing the zoom lens ZL of Example 2, excellent optical performance can also be insured for a digital still camera (optical apparatus, see FIG. 1 and FIG. 2), and the method for forming an image of an object according to the present embodiment.

Example 3

Example 3 of the present embodiment will now be described with reference to FIG. 12 to FIG. 15 and Table 3.

Figure 12:
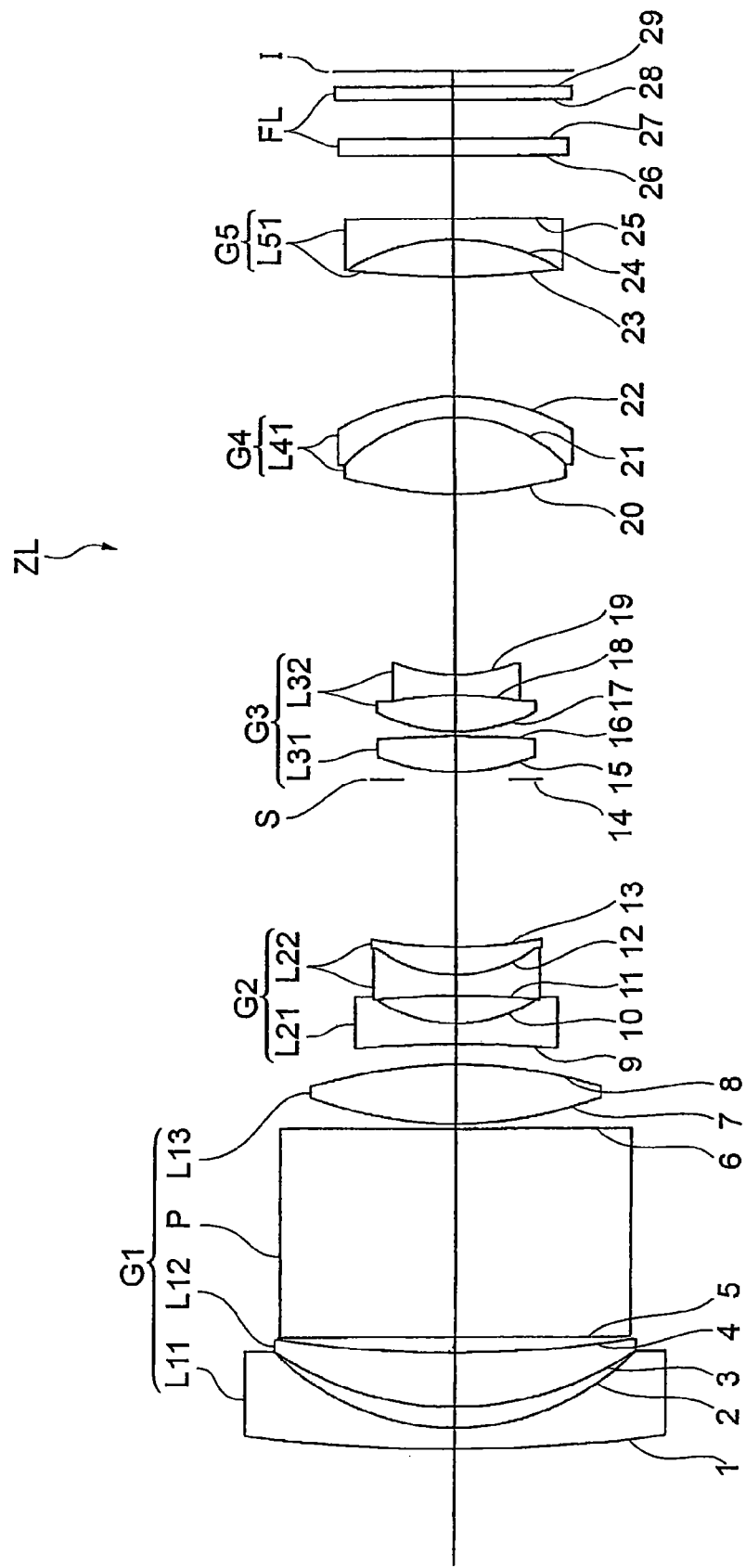
FIG. 12 is a cross-sectional view depicting a zoom lens according to Example 3.

FIG. 12 is a diagram depicting a configuration of a zoom lens ZL (in a wide-angle end state) according to Example 3. The zoom lens ZL of Example 3 has a similar configuration as Example 1, except for the configuration of the second lens group G2, so each composing element is denoted with the same reference symbol as Example 1, for which detailed description is omitted. A second lens group G2 of Example 3 is comprised of a biconcave negative lens L21 having an aspherical surface to the image, and a negative cemented lens L22 where a negative meniscus lens having a concave surface facing the image and a positive meniscus lens having a convex surface facing the object are bonded. In the present example, an aperture stop S is disposed in the third lens group G3, and moves along the optical axis during zooming from the wide-angle end state to the telephoto end state.

Table 3 shows each data of Example 3. The surface numbers 1 to 29 in Table 3 correspond to the surfaces 1 to 29 in FIG. 12. In Example 3, each lens surface of the seventh, eighth, tenth, fifteenth and twentieth surface are formed in a spherical shape.

In the table, d8 is an axial air distance between the first lens group G1 and the second lens group G2, d13 is an axial air distance between the second lens group G2 and the aperture stop S, d14 is an axial air distance between the aperture stop S and the third lens group G3, d19 is an axial air distance between the third lens group G3 and the fourth lens group G4, and d22 is an axial air distance between the fourth lens group G4 and the fifth lens group G5. These axial air distances d8, d13, d14, d19 and d22 change during zooming. In the table, values corresponding to the conditional expressions (1) to (10), that is condition correspondence values, are also shown.

TABLE 3

[All parameters]

| | Wide-angle end | | intermediate focal length | | telephoto end |
|---|---|---|---|---|---|
| f = | 5.17 | to | 12.54 | to | 18.20 |
| F.No = | 3.63 | to | 4.18 | to | 5.04 |
| 2ω = | 79.76 | to | 35.45 | to | 24.64 |
| Image height = | 4.05 | to | 4.05 | to | 4.05 |
| Total lens length = | 53.50 | to | 53.50 | to | 53.50 |

[Lens parameters]

| Surface number | Radius of curvature | Surface distance | Refractive index | Abbe number |
|---|---|---|---|---|
| 1 | 64.4293 | 0.80 | 2.00069 | 25.46 |
| 2 | 9.6002 | 0.80 | | |
| 3 | 12.2387 | 2.07 | 1.48749 | 70.23 |
| 4 | 46.9835 | 0.60 | | |
| 5 | 0.0000 | 8.00 | 2.00069 | 25.46 |

TABLE 3-continued

| | | | | |
|---|---|---|---|---|
| 6 | 0.0000 | 0.20 | | |
| 7* | 14.7058 | 2.31 | 1.76802 | 49.24 |
| 8* | −17.3539 | (d8) | | |
| 9 | −43.1345 | 0.80 | 1.77377 | 47.17 |
| 10* | 5.4668 | 1.08 | | |
| 11 | −27.7417 | 0.80 | 1.80400 | 46.57 |
| 12 | 5.0000 | 1.10 | 2.00069 | 25.46 |
| 13 | 18.4084 | (d13) | | |
| 14 | 0.0000 | (d14) | | (aperture stop S) |
| 15* | 7.4404 | 1.40 | 1.58313 | 59.46 |
| 16 | −40.7751 | 0.20 | | |
| 17 | 6.5502 | 1.43 | 1.69895 | 30.13 |
| 18 | −12.1745 | 0.80 | 1.90366 | 31.31 |
| 19 | 6.0889 | (d19) | | |
| 20* | 12.0526 | 3.00 | 1.59201 | 67.05 |
| 21 | −5.7161 | 0.80 | 1.94594 | 17.98 |
| 22 | −8.4537 | (d22) | | |
| 23 | 30.5102 | 1.44 | 1.49700 | 81.54 |
| 24 | −7.6670 | 0.80 | 1.88300 | 40.76 |
| 25 | −597.2878 | 2.43 | | |
| 26 | 0.0000 | 0.65 | 1.54437 | 70.51 |
| 27 | 0.0000 | 1.50 | | |
| 28 | 0.0000 | 0.50 | 1.51633 | 64.14 |
| 29 | 0.0000 | (Bf) | | |

[Focal length of each lens group]

| Group | Starting surface | Focal length |
|---|---|---|
| 1 | 1 | 12.9715 |
| 2 | 9 | −4.5816 |
| 3 | 15 | 13.2297 |
| 4 | 20 | 10.5490 |
| 5 | 23 | −31.4554 |

[Aspherical surface data]

| Surface number | K | A4 | A6 | A8 | A10 |
|---|---|---|---|---|---|
| 7 | +4.5892 | −2.4132E−04 | −6.2762E−07 | −5.2322E−10 | −1.9329E−09 |
| 8 | −8.9672 | −2.1107E−04 | +5.7745E−06 | −1.2164E−07 | +9.9942E−10 |
| 10 | −6.3099 | +5.0196E−03 | −3.6752E−04 | +2.0484E−05 | −4.1136E−07 |
| 15 | +1.0268 | −2.9219E−04 | −3.1370E−06 | −7.4243E−07 | +1.1479E−07 |
| 20 | −9.0000 | +2.5999E−04 | −5.9107E−06 | −2.5634E−07 | +1.0806E−08 |

[Variable distance]

| | Wide-angle end | intermediate focal length | telephoto end |
|---|---|---|---|
| F | 5.1700 | 12.5387 | 18.2000 |
| d8 | 0.8000 | 5.1318 | 6.2305 |
| d13 | 6.5431 | 1.9500 | 1.2000 |
| d14 | 0.2872 | 0.5486 | 0.1999 |
| d19 | 7.0787 | 3.0106 | 1.0000 |
| d22 | 4.6779 | 8.7456 | 10.7556 |
| Bf | 0.5992 | 0.5996 | 0.6003 |

[Condition mapping values]

$vd = 70.23$
$\beta aw = 9.0777$
$\beta bw = -0.1127$
$vd1 = 25.46$
$vd2 = 70.23$
$nd1 = 2.00069$
$nd2 = 1.48749$
$fw = 5.1700$
$f1 = 12.9715$
$f2 = -4.5816$
$fs = 13.2297$

| | |
|---|---|
| Conditional expression (1) | vd (=vd2) = 70.23 |
| Conditional expression (2) | βbw × (1 − βaw) = 0.9104 |
| Conditional expression (3) | fw/fs = 0.3908 |
| Conditional expression (4) | vd1 = 25.46 |
| Conditional expression (5) | vd2 = 70.23 |
| Conditional expression (6) | nd1 = 2.00069 |
| Conditional expression (7) | nd2 = 1.48749 |
| Conditional expression (8) | (−f2)/fw = 0.8862 |

TABLE 3-continued

| Conditional expression (9) | f1/(−f2) = 2.8312 |
| Conditional expression (10) | L1/Lp = 0.53 |

As the data in Table 3 shows, the zoom lens ZL of the present example satisfies all the conditional expressions (1) to (10).

Figure 13A:
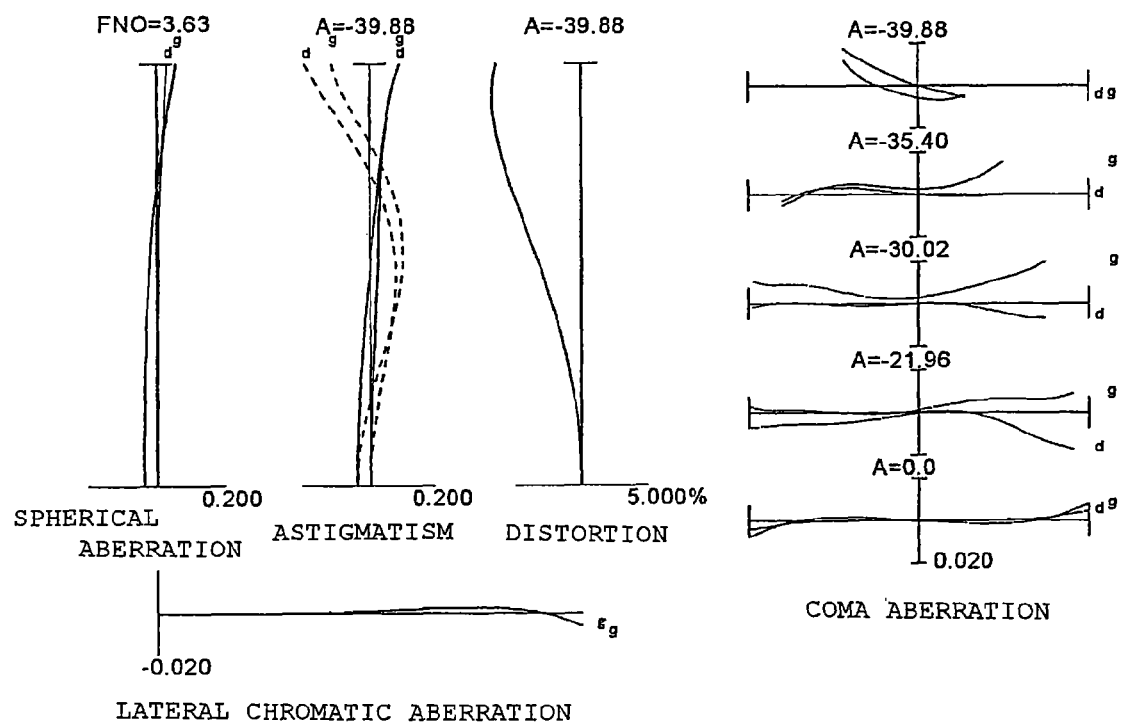
FIG. 13A are graphs showing various aberrations of the zoom lens according to Example 3 upon focusing on infinity in the wide-angle end state.
Figure 13B:
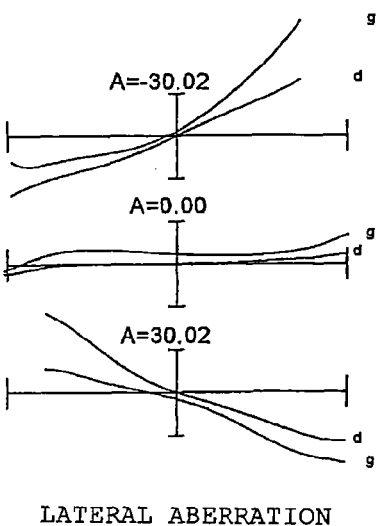
FIG. 13B is a graph showing lateral aberration of the zoom lens upon lens shifting in the wide-angle end state.
Figure 14A:
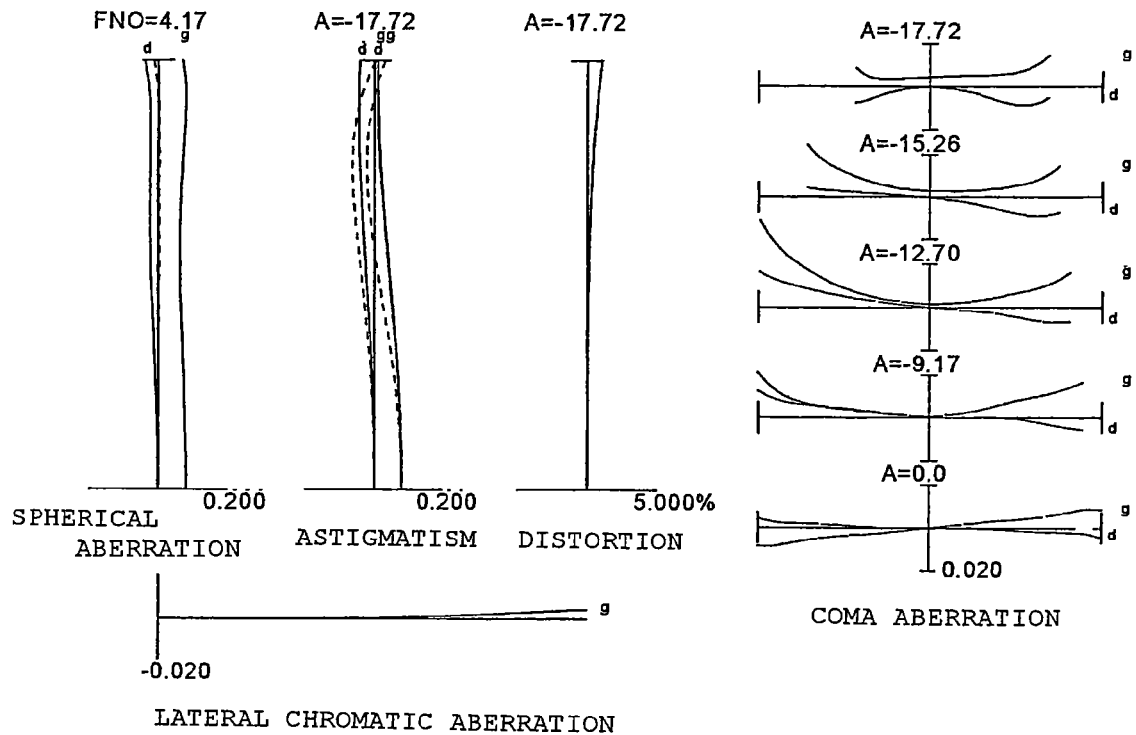
FIG. 14A are graphs showing various aberrations of the zoom lens according to Example 3 upon focusing on infinity in the intermediate focal length state.
Figure 14B:
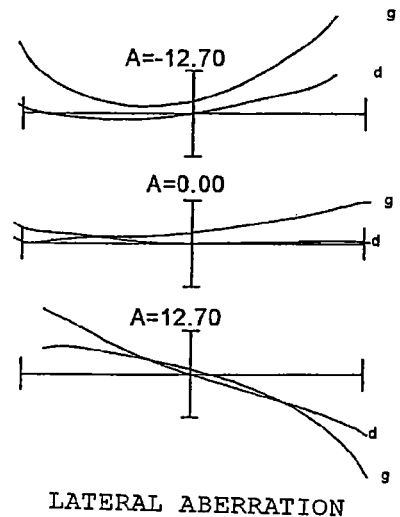
FIG. 14B is a graph showing lateral aberration of the zoom lens upon lens shifting in the intermediate focal length state.
Figure 15A:
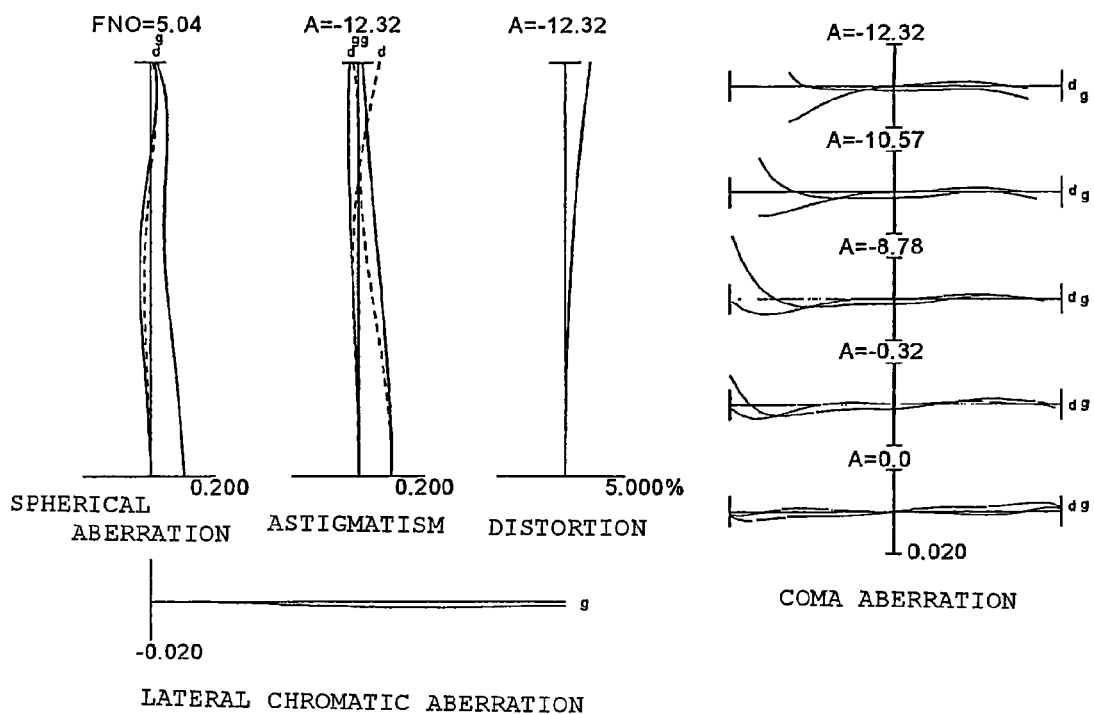
FIG. 15A are graphs showing various aberrations of the zoom lens according to Example 3 upon focusing on infinity in the telephoto end state.
Figure 15B:
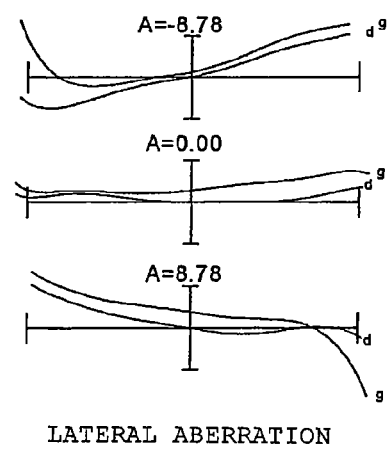
FIG. 15B is a graph showing lateral aberration upon lens shifting in the telephoto end state.

FIG. 13 to FIG. 15 are graphs showing various aberrations of the zoom lens according to Example 3 with respect to the d-line (wavelength: 587.6 nm) and g-line (wavelength: 435.8 nm). In other words, FIG. 13A are graphs showing various aberrations of the zoom lens upon focusing on infinity in the wide-angle end state (f=5.17 mm), FIG. 13B is a graph showing a lateral aberration when the lens is shifted in the wide-angle end state (f=5.17 mm), FIG. 14A are graphs showing various aberrations of the zoom lens focusing on infinity in the intermediate focal length state (f=12.54 mm), FIG. 14B is a graph showing the lateral aberration when the lens is shifted in the intermediate focal length state (f=12.54 mm), FIG. 15A are graphs sowing various aberrations of the zoom lens upon focusing on infinity in the telephoto end state (f=18.20 mm), and FIG. 15B is a graph showing a lateral aberration when the lens is shifted in the telephoto end state (f=18.20 mm).

As each aberration graph shows, in Example 3, various aberrations are well corrected in each focal length state from the wide-angle end state to the telephoto end state, and excellent image forming performance is implemented.

By installing the zoom lens ZL of Example 3, excellent optical performance can be insured for a digital still camera (optical apparatus, see FIG. 1 and FIG. 2), and the method for forming an image of an object according to the present embodiment.

Example 4

Figure 16:
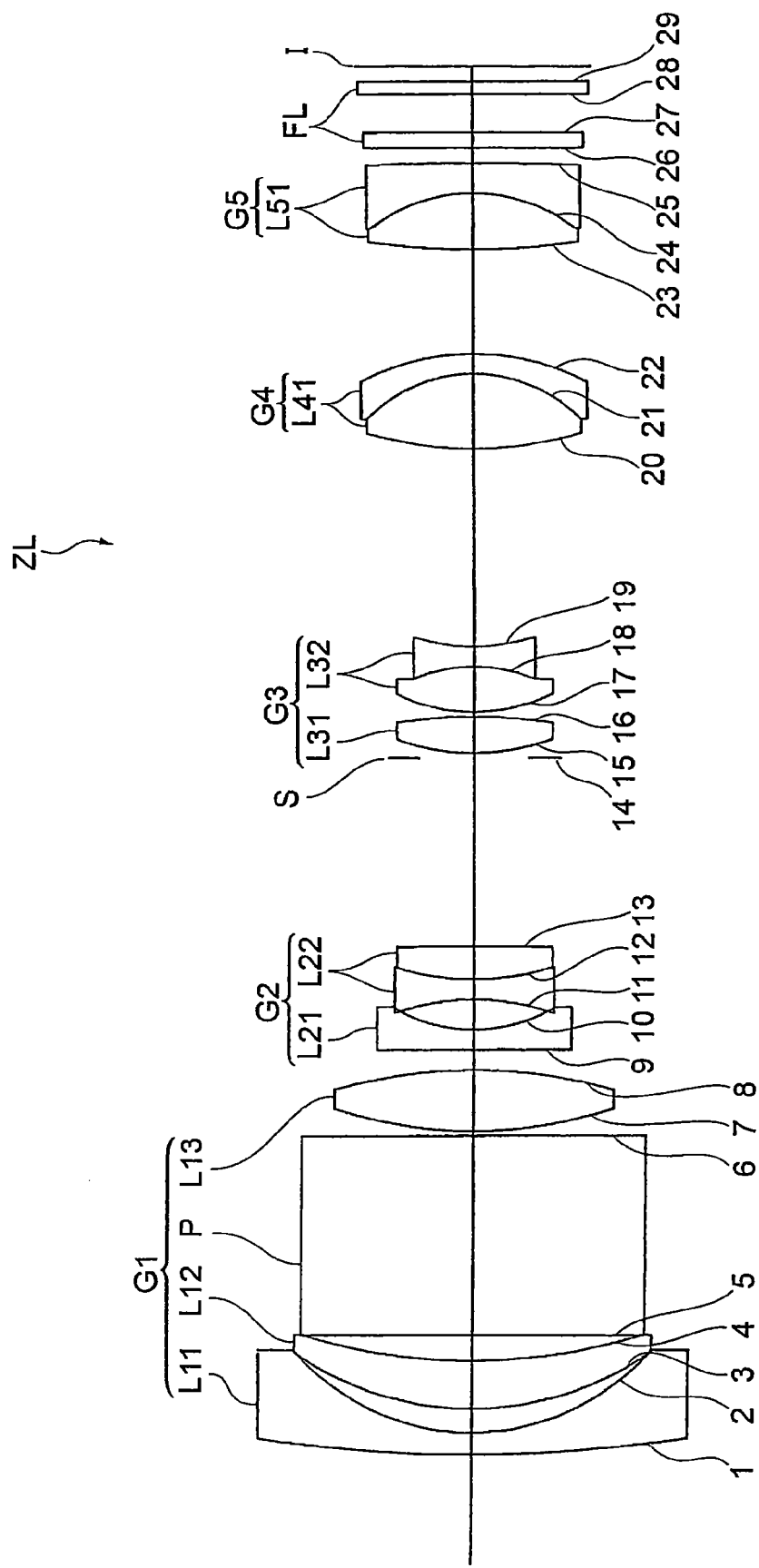
FIG. 16 is a cross-sectional view depicting a zoom lens according to Example 4.

Example 4 of the present embodiment will now be described with reference to FIG. 16 to FIG. 19 and Table 4. FIG. 16 is a diagram depicting a configuration of a zoom lens ZL (in a wide-angle end state) according to Example 4. The zoom lens ZL of Example 4 has a similar configuration as Example 1, so each composing element is denoted with the same reference symbol as Example 1, for which detailed description is omitted.

Table 4 shows each data of Example 4. The surface numbers 1 to 29 in Table 4 correspond to the surfaces 1 to 29 in FIG. 16. In Example 4, each lens surface of the seventh, eighth, tenth, fifteenth and twentieth surface is formed in an aspherical shape.

In the table, d8 is an axial air distance between the first lens group G1 and the second lens group G2, d13 is an axial air distance between the second lens group G2 and the third lens group G3, d19 is an axial air distance between the third lens group G3 and the fourth lens group G4, and d22 is an axial air distance between the fourth lens group G4 and the fifth lens group G5. These axial air distances d8, d13, d19 and d22 change during zooming. In the table, values corresponding to the above mentioned conditional expressions (1) to (10), that is condition correspondence values, are also shown.

TABLE 4

[All parameters]

| | Wide-angle end | | intermediate focal length | | telephoto end |
|---|---|---|---|---|---|
| f = | 5.17 | to | 11.21 | to | 17.25 |
| F.No = | 3.79 | to | 4.20 | to | 4.98 |
| 2ω = | 80.04 | to | 39.12 | to | 25.73 |
| Image height = | 4.05 | to | 4.05 | to | 4.05 |
| Total lens length = | 55.00 | to | 55.00 | to | 55.00 |

[Lens parameters]

| Surface number | Radius of curvature | Surface distance | Refractive index | Abbe number |
|---|---|---|---|---|
| 1 | 55.5588 | 0.85 | 1.84666 | 23.78 |
| 2 | 9.1410 | 0.93 | | |
| 3 | 12.0609 | 1.87 | 1.48749 | 70.23 |
| 4 | 22.6706 | 1.00 | | |
| 5 | 0.0000 | 7.80 | 1.83400 | 37.16 |
| 6 | 0.0000 | 0.20 | | |
| 7* | 15.9080 | 2.43 | 1.76802 | 49.24 |
| 8* | −19.2882 | (d8) | | |
| 9 | 1405.3136 | 0.80 | 1.83441 | 37.28 |
| 10* | 6.0514 | 1.20 | | |
| 11 | −9.3219 | 0.80 | 1.75500 | 52.32 |
| 12 | 9.8308 | 1.32 | 1.92286 | 18.90 |
| 13 | −110.1293 | (d13) | | |
| 14 | 0.0000 | 0.20 | | (aperture stop S) |
| 15* | 8.7802 | 1.45 | 1.74330 | 49.32 |
| 16 | −20.2367 | 0.20 | | |
| 17 | 6.9464 | 1.81 | 1.58313 | 59.37 |
| 18 | −6.0891 | 0.80 | 1.88300 | 40.76 |
| 19 | 7.0138 | (d19) | | |
| 20* | 12.8450 | 3.00 | 1.59201 | 67.02 |
| 21 | −5.7031 | 0.80 | 1.84666 | 23.78 |
| 22 | −9.3039 | (d22) | | |

TABLE 4-continued

| 23 | 27.6756 | 2.21 | 1.48749 | 70.23 |
| 24 | −6.4806 | 1.20 | 1.90366 | 31.31 |
| 25 | −100.2856 | 0.60 | | |
| 26 | 0.0000 | 0.60 | 1.54437 | 70.51 |
| 27 | 0.0000 | 1.50 | | |
| 28 | 0.0000 | 0.50 | 1.51633 | 64.14 |
| 29 | 0.0000 | (Bf) | | |

[Focal length of each lens group]

| Group | Starting surface | Focal length |
| --- | --- | --- |
| 1 | 1 | 14.9270 |
| 2 | 9 | −5.0500 |
| 3 | 15 | 11.9370 |
| 4 | 20 | 11.3374 |
| 5 | 23 | −27.8616 |

[Aspherical surface data]

| Surface number | K | A4 | A6 | A8 | A10 |
| --- | --- | --- | --- | --- | --- |
| 7 | +1.9260 | −1.2657E−04 | +1.0474E−06 | −4.4623E−08 | +1.0028E−09 |
| 8 | −7.8335 | −1.7200E−04 | +2.7826E−06 | −6.0027E−08 | +1.0538E−09 |
| 10 | −8.4402 | +4.9173E−03 | −3.8781E−04 | +2.4980E−05 | −6.0664E−07 |
| 15 | −8.3597 | +1.7672E−03 | −6.4980E−05 | +4.0000E−06 | −1.5423E−07 |
| 20 | −2.3220 | −1.0102E−04 | +9.0886E−06 | −6.0404E−07 | +1.6984E−08 |

[Variable distance]

| | Wide-angle end | intermediate focal length | telephoto end |
| --- | --- | --- | --- |
| F | 5.1700 | 11.2100 | 17.2499 |
| d8 | 0.8000 | 5.5718 | 7.1202 |
| d13 | 7.5202 | 2.7484 | 1.2000 |
| d19 | 7.9043 | 3.6209 | 1.0205 |
| d22 | 4.1170 | 8.4003 | 11.0004 |
| Bf | 0.5999 | 0.5999 | 0.6003 |

[Condition mapping values]

$\nu d = 70.23$
$\beta aw = -9.9348$
$\beta bw = 0.0997$
$\nu d1 = 23.78$
$\nu d2 = 70.23$
$nd1 = 1.84666$
$nd2 = 1.48749$
$fw = 5.1700$
$f1 = 14.9270$
$f2 = -5.0500$
$fs = 11.9370$

| Conditional expression (1) | $\nu d$ (=$\nu d2$) = 70.23 |
| Conditional expression (2) | $\beta bw \times (1 - \beta aw) = 1.0903$ |
| Conditional expression (3) | $fw/fs = 0.4331$ |
| Conditional expression (4) | $\nu d1 = 23.78$ |
| Conditional expression (5) | $\nu d2 = 70.23$ |
| Conditional expression (6) | $nd1 = 1.84666$ |
| Conditional expression (7) | $nd2 = 1.48749$ |
| Conditional expression (8) | $(-f2)/fw = 0.9768$ |
| Conditional expression (9) | $f1/(-f2) = 2.9558$ |
| Conditional expression (10) | $L1/Lp = 0.60$ |

As the data table in Table 4 shows, the zoom lens ZL of the present example satisfies all the conditional expressions (1) to (10).

Figure 17A:
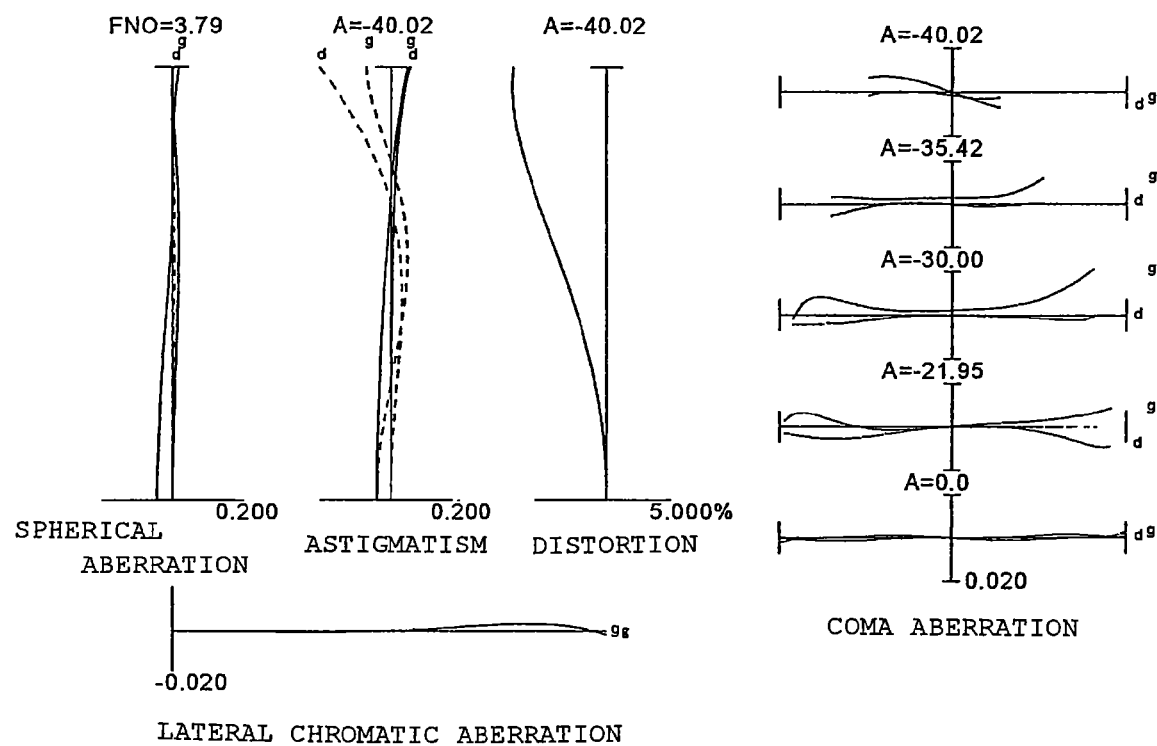
FIG. 17A are graphs showing various aberrations of the zoom lens according to Example 4 upon focusing on infinity in the wide-angle end state.
Figure 17B:
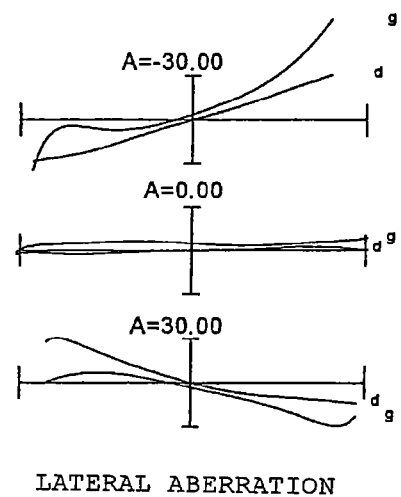
FIG. 17B is a graph showing lateral aberration of the zoom lens upon lens shifting in the wide-angle end state.
Figure 18A:
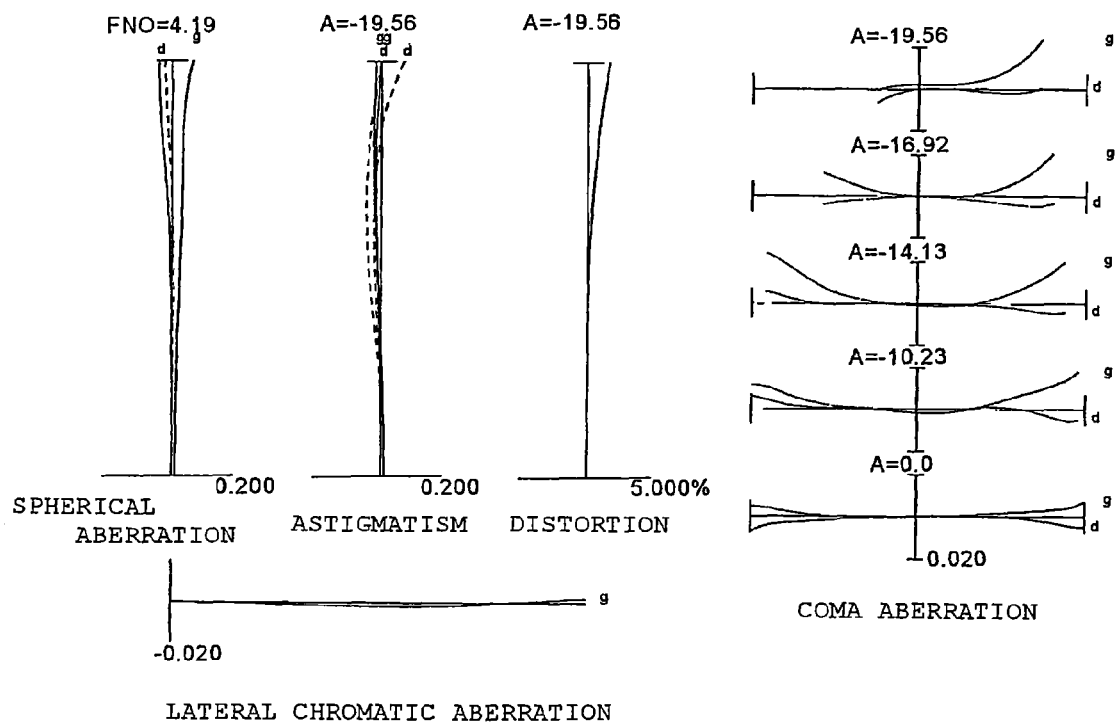
FIG. 18A are graphs showing various aberrations of the zoom lens according to Example 4 upon focusing on infinity in the intermediate focal length state.
Figure 18B:
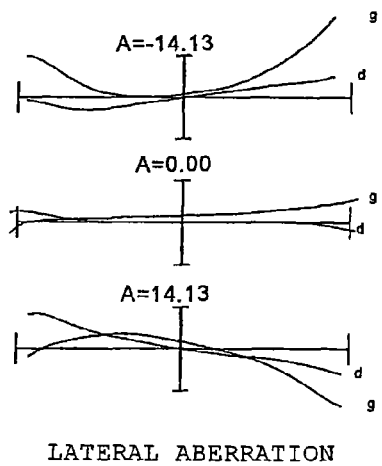
FIG. 18B is a graph showing lateral aberration of the zoom lens upon lens shifting in the intermediate focal length state.
Figure 19A:
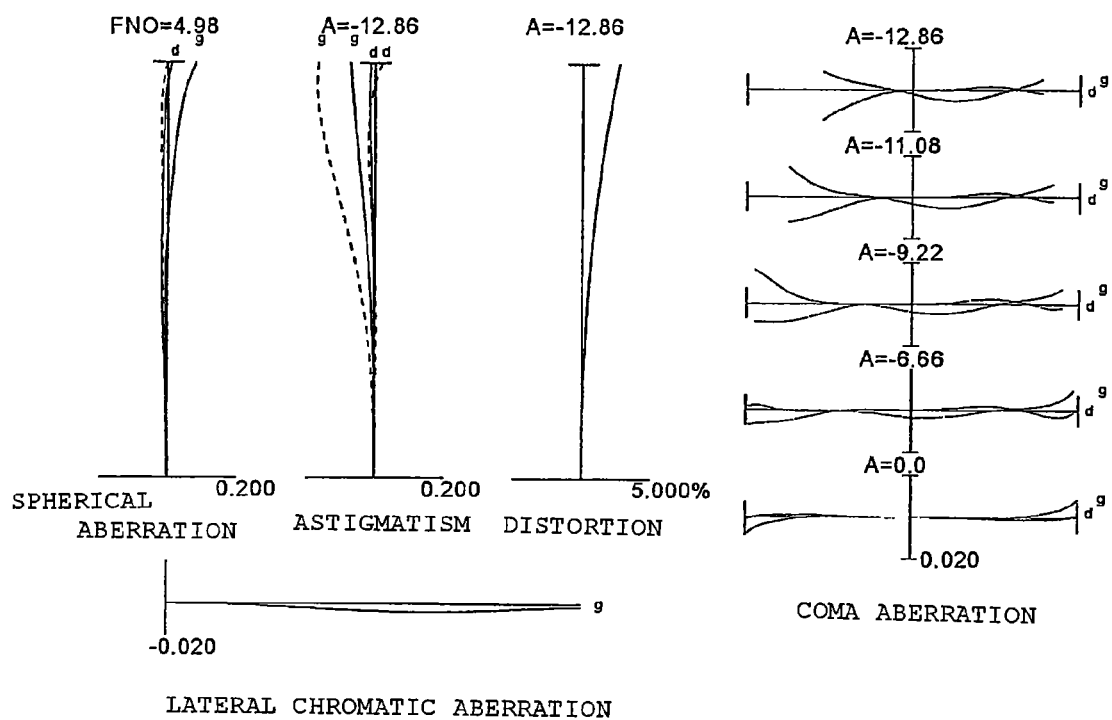
FIG. 19A are graphs showing various aberrations of the zoom lens according to Example 4 upon focusing on infinity in the telephoto end state.
Figure 19B:
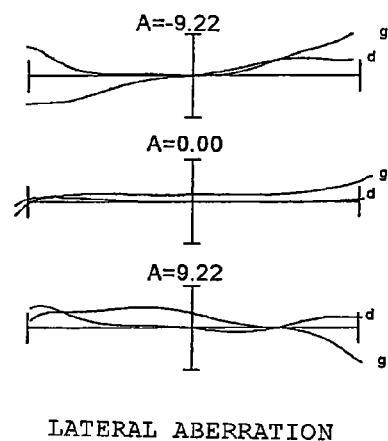
FIG. 19B is a graph showing lateral aberration upon lens shifting in the telephoto end state.

FIG. 17 to FIG. 19 are graphs showing various aberrations of the zoom lens according to Example 4 with respect to the d-line (wavelength: 587.6 nm) and g-line (wavelength: 435.8 nm). In other words, FIG. 17A are graphs showing various aberrations of the zoom lens upon focusing on infinity in the wide-angle end state (f=5.17 mm), FIG. 17B is a graph showing a lateral aberration when the lens is shifted in the wide-angle end state (f=5.17 mm), FIG. 18A are graphs showing various aberrations of the zoom lens upon focusing on infinity in the intermediate focal length state (f=11.21 mm), FIG. 18B is a graph showing a lateral aberration when the lens is shifted in the intermediate focal length state (f=11.21 mm), FIG. 19A are graphs showing various aberrations of the zoom lens upon focusing on infinity in the telephoto end state (f=17.25 mm), and FIG. 19B is a graph showing a lateral aberration when the lens is shifted in the telephoto end state (f=17.25 mm).

As each aberration graph shows, in Example 4, various aberrations are well corrected in each focal length state from the wide-angle end state to the telephoto end state, and excellent image forming performance is implemented.

By installing the zoom lens ZL of Example 4, excellent optical performance can also be insured for a digital still camera (optical apparatus, see FIG. 1 and FIG. 2), and a method for forming an image of an object according to the present embodiment.

In the above embodiment, the following variant forms can be used within a scope where the optical performance is not diminished.

In each of the above examples, the zoom lens has a five-group configuration, but other configurations, such as a four-group or six-group configuration may be used. A configuration in which a lens or a lens group is added to a position closest to the object, or a configuration in which a lens or a lens group is added to a position closest to the image, may be used. Each lens component may be bonded with another lens component and used as a cemented lens. And each cemented lens may be separated and used as an individual lens component. The optical axis bending element may be bonded with at least one of the lenses disposed to the object or to the image thereof.

A single or a plurality of lens groups, or a part of a lens group, may be moved in the optical axis direction to focus on an object at infinity to an object at close distance, that is, a focusing lens group may be used. This focusing lens group may also be applied to auto focus, and is also appropriate for driving a motor for auto focus (e.g. ultrasonic motor). In particular, it is preferable that the second or third lens group is the focusing lens group.

A lens group or a part of a lens group may be oscillated in a direction perpendicular to the optical axis to correct an image blur generated by motion blur, that is a vibration proof lens group may be used. In particular, it is preferable that the third lens group is a vibration proof lens group. The second lens group or the fifth lens group may be a vibration proofing lens group.

Each lens surface may be an aspherical surface. Each lens surface may be an aspherical surface created by grinding, or a glass molded aspherical surface which is a glass created into an aspherical shape using a mold, or a composite type aspherical surface where a resin is formed in an aspherical shape on the surface of a glass.

It is preferable that the aperture stop is disposed near the shift lens group, but the lens frame may take over this role, without disposing an element as the aperture stop.

On each lens surface, an anti-reflection film, which has high transmittance in a wide wavelength range, is formed, so a flare and a ghost can be decreased, and high optical performance with high contrast can be implemented.

In order to assist understanding, the present invention was described using the above configuration requirements of the embodiment, but needless to say the present invention is not limited to this.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising a plurality of lens groups which are disposed in order from an object along an optical axis,
   wherein among the plurality of lens groups, a first lens group which is disposed closest to the object has a positive refractive power,
   the first lens group comprises an optical axis bending element for bending the optical axis, and a plurality of lens components which are disposed closer to the object than the optical axis bending element,
   the plurality of lens components are formed of only two lenses,
   the plurality of lens components include a positive lens that satisfies a condition of $$vd > 50,$$

where $vd$ is an Abbe number with respect to d-line, and
   at least one of the lens groups, which are disposed closer to the image than the first lens group, at least partially includes a shift lens group that can move in a direction substantially perpendicular to the optical axis;
   wherein the plurality of lens components are formed of a negative lens and the positive lens which are disposed in order from the object; and
   wherein the negative lens and the positive lens are air-spaced along the optical axis.

2. The zoom lens according to claim 1, wherein a condition of $$0.7 < \beta bw \times (1 - \beta aw) < 1.4$$

is satisfied, where $\beta aw$ is a lateral magnification of the shift lens group in a wide-angle end state, and $\beta bw$ is a lateral magnification of the zoom lens that is disposed between the shift lens group and the image in the wide-angle end state.

3. The zoom lens according to claim 1, wherein the plurality of lens components are formed of a negative meniscus lens having a convex surface facing the object, and a positive meniscus lens having a convex surface facing the object, which are disposed in order from the object.

4. The zoom lens according to claim 1, wherein the shift lens group is fixed to a position on the optical axis during zooming from a wide-angle end state to a telephoto end state.

5. The zoom lens according to claim 1, wherein the shift lens group comprises a plurality of lens components.

6. The zoom lens according to claim 1, wherein the shift lens group comprises a cemented lens.

7. The zoom lens according to claim 1, wherein a condition of $$0.3 < fw/|fs| < 0.5$$

is satisfied, where $fw$ is a focal length of the zoom lens in the wide-angle end state, and $fs$ is a focal length of the shift lens group.

8. The zoom lens according to claim 1, wherein the angle of view in the wide-angle end state is 75 degrees or more.

9. The zoom lens according to claim 1, wherein an aperture stop is disposed near the shift lens group.

10. The zoom lens according to claim 1, wherein an aperture stop is disposed near the object side of the lens group that includes the shift lens group.

11. The zoom lens according to claim 1, wherein a condition of $$vd1 < 50$$

is satisfied, where $vd1$ is an Abbe number, with respect to the d-line, of the negative lens in the first lens group.

12. The zoom lens according to claim 1, wherein a condition of $$vd2 > 50$$

is satisfied, where $vd2$ is an Abbe number, with respect to the d-line, of the positive lens in the first lens group.

13. The zoom lens according to claim 1, wherein a condition of $$nd1 > 1.75$$

is satisfied, where nd1 is a refractive index, with respect to the d-line, of the negative lens in the first lens group.

14. The zoom lens according to claim 1, wherein a condition of $$nd2 < 1.65$$

is satisfied, where nd2 is a refractive index, with respect to the d-line, of the positive lens in the first lens group.

15. The zoom lens according to claim 1, wherein the second lens group, which is disposed to the image side of the first lens group, has a negative refractive index, and a condition of $$0.4 < (-f2)/fw < 1.9$$

is satisfied, where fw is a focal length of the zoom lens in the wide-angle end state, and f2 is a focal length of the second lens group.

16. The zoom lens according to claim 1, wherein a condition of $$2.4 \leq f1/(-f2) < 3.7$$

is satisfied, where f1 is a focal length of the first lens group, and f2 is a focal length of the second lens group which is disposed to the image side of the first lens group.

17. The zoom lens according to claim 1, wherein
the plurality of lens groups comprise at least the first lens group, a second lens group and a third lens group, which are disposed in order from the object along an optical axis and
the third lens group is a lens group that includes the shift lens group.

18. The zoom lens according to claim 1, wherein
the plurality of lens groups comprise the first lens group, a second lens group, a third lens group, a fourth lens group and a fifth lens group, which are disposed in order from the object along an optical axis, and
the third lens group is a lens group that includes the shift lens group.

19. The zoom lens according to claim 18, wherein
the second lens group has a negative refractive power, the third lens group has a positive refractive power, the fourth lens group has a positive refractive power, and the fifth lens group has a negative refractive power.

20. The zoom lens according to claim 1, wherein the optical axis bending element is a prism, and satisfies a condition of $$L1/Lp < 1.0,$$

where L1 is a distance on the optical axis from the surface closest to the object in the first lens group to the prism, and Lp is a distance of the prism on the optical axis.

21. An optical apparatus comprising the zoom lens according to claim 1.

22. A method for forming an image of an object that uses a zoom lens which has a plurality of lens groups which are disposed in order from the object along an optical axis, wherein the plurality of the lens groups include
a first lens group, which is disposed closest to the object among the plurality of lens groups, and has a positive refractive power,
the first lens group comprises an optical axis bending element for bending the optical axis and a plurality of lens components which are disposed closer to the object than the optical axis bending element,
the plurality of the lens components are formed of only two lenses,
the plurality of lens components include a positive lens that satisfies a condition of $$vd50,$$

where vd is an Abbe number with respect to the d-line, and
at least one of the lens groups, which are disposed closer to the image than the first lens group, at least partially includes a shift lens group that can move in a direction substantially perpendicular to the optical axis;
wherein the plurality of lens components are formed of a negative lens and the positive lens which are disposed in order from the object; and
wherein the negative lens and the positive lens are air-spaced along the optical axis.

23. The method for forming an image of an object according to claim 22, wherein a condition of $$0.7 < \beta bw \times (1 - \beta aw) < 1.4$$

is satisfied, where βaw is a lateral magnification of the shift lens group in a wide-angle end state, and βbw is a lateral magnification of the zoom lens that is disposed between the shift lens group and the image in the wide-angle end state.

24. The method for forming an image of an object according to claim 22, wherein the plurality of lens components are formed of a negative meniscus lens having a convex surface facing the object, and a positive meniscus lens having a convex surface facing the object, which are disposed in order from the object.

25. The method for forming an image of an object according to claim 22, wherein the shift lens group is fixed to a position on the optical axis during zooming from a wide-angle end state to a telephoto end state.

26. The method for forming an image of an object according to claim 22, wherein the shift lens group comprises a plurality of lens components.

27. The method for forming an image of an object according to claim 22, wherein the shift lens group comprises a cemented lens.

28. The method for forming an image of an object according to claim 22, wherein a condition of $$0.3 < fw/|fs| < 0.5$$

is satisfied, where fw is a focal length of the zoom lens in the wide-angle end state, and fs is a focal length of the shift lens group.

29. The method for forming an image of an object according to claim 22, wherein the angle of view in the wide-angle end state is 75 degrees or more.

30. The method for forming an image of an object according to claim 22, wherein an aperture stop is disposed near the shift lens group.

31. The method for forming an image of an object according to claim 22, wherein an aperture stop is disposed near the object side of the lens group that includes the shift lens group.

32. The method for forming an image of an object according to claim 22, wherein a condition of $$vd1 < 50$$

is satisfied, where vd1 is an Abbe number, with respect to the d-line, of the negative lens in the first lens group.

33. The method for forming an image of an object according to claim 22, wherein a condition of $$vd2 > 50$$

is satisfied, where vd2 is an Abbe number, with respect to the d-line, of the positive lens in the first lens group.

34. The method for forming an image of an object according to claim 22, wherein a condition of $$nd1>1.75$$

is satisfied, where nd1 is a refractive index, with respect to the d-line, of the negative lens in the first lens group.

35. The method for forming an image of an object according to claim 22, wherein a condition of $$nd2<1.65$$

is satisfied, where nd2 is a refractive index, with respect to the d-line, of the positive lens in the first lens group.

36. The method for forming an image of an object according to claim 22, wherein the second lens group, which is disposed to the image side of the first lens group, has a negative refractive index, and a condition of $$0.4<(-f2)/fw<1.9$$

is satisfied, where fw is a focal length of the zoom lens in the wide-angle end state, and f2 is a focal length of the second lens group.

37. The method for forming an image of an object according to claim 22, wherein a condition of $$2.4<f1/(-f2)<3.7$$

is satisfied, where f1 is a focal length of the first lens group, and f2 is a focal length of the second lens group which is disposed to the image side of the first lens group.

38. The method for forming an image of an object according to claim 22, wherein
   the plurality of lens groups comprise at least the first lens group, a second lens group and a third lens group, which are disposed in order from the object along an optical axis and
   the third lens group is a lens group that includes the shift lens group.

39. The method for forming an image of an object according to claim 22, wherein
   the plurality of lens groups comprise the first lens group, a second lens group, a third lens group, a fourth lens group and a fifth lens group, which are disposed in order from the object along an optical axis and
   the third lens group is a lens group that includes the shift lens group.

40. The method for forming an image of an object according to claim 39, wherein the second lens group has a negative refractive power, the third lens group has a positive refractive power, the fourth lens group has a positive refractive power, and the fifth lens group has a negative refractive power.

41. A zoom lens comprising a plurality of lens groups which are disposed in order from an object along an optical axis,
   wherein among the plurality of lens groups, a first lens group which is disposed closest to the object has a positive refractive power,
   the first lens group comprises an optical axis bending element for bending the optical axis, and a plurality of lens components which are disposed closer to the object than the optical axis bending element,
   the plurality of lens components are formed of only two lenses,
   the plurality of lens components include a positive lens that satisfies a condition of $$vd50,$$

where vd is an Abbe number with respect to d-line, and
   at least one of the lens groups, which are disposed closer to the image than the first lens group, at least partially includes a shift lens group that can move in a direction substantially perpendicular to the optical axis; and
   wherein the plurality of lens components are formed of a negative meniscus lens having a convex surface facing the object, and a positive meniscus lens having a convex surface facing the object, which are disposed in order from the object.

42. A method for forming an image of an object, that comprises providing a zoom lens with a plurality of lens groups which are disposed in order from the object along an optical axis, wherein the plurality of lens groups include
   a first lens group, which is disposed closest to the object among the plurality of lens groups, and has a positive refractive power,
   the first lens group comprising an optical axis bending element for bending the optical axis and a plurality of lens components which are disposed closer to the object than the optical axis bending element,
   the plurality of lens components are formed of only two lenses,
   the plurality of lens components include a positive lens that satisfies a condition of $$vd50,$$

where vd is an Abbe number with respect to d-line, and
   at least one of the lens groups, which are disposed closer to the image than the first lens group, at least partially includes a shift lens group that can move in a direction substantially perpendicular to the optical axis; and
   wherein the plurality of lens components are formed of a negative meniscus lens having a convex surface facing the object, and a positive meniscus lens having a convex surface facing the object, which are disposed in order from the object.

* * * * *